(12) United States Patent
Tanaka et al.

(10) Patent No.: US 12,225,410 B2
(45) Date of Patent: Feb. 11, 2025

(54) COMMUNICATION CONTROL APPARATUS AND METHOD, AND WIRELESS COMMUNICATION APPARATUS AND METHOD

(71) Applicant: SONY GROUP CORPORATION, Tokyo (JP)

(72) Inventors: Yusuke Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 403 days.

(21) Appl. No.: 17/437,911

(22) PCT Filed: Mar. 12, 2020

(86) PCT No.: PCT/JP2020/010743
§ 371 (c)(1),
(2) Date: Sep. 10, 2021

(87) PCT Pub. No.: WO2020/195878
PCT Pub. Date: Oct. 1, 2020

(65) Prior Publication Data
US 2022/0174545 A1   Jun. 2, 2022

(30) Foreign Application Priority Data
Mar. 26, 2019   (JP) .................. 2019-058943

(51) Int. Cl.
*H04W 28/12* (2009.01)
(52) U.S. Cl.
CPC .................. *H04W 28/12* (2013.01)
(58) Field of Classification Search
CPC ............. H04W 28/02; H04W 28/0231; H04W 28/0242; H04W 28/04; H04W 28/0861;
(Continued)

(56) References Cited

U.S. PATENT DOCUMENTS

2002/0181437 A1* 12/2002 Ohkubo ................ H04W 36/02
370/349
2015/0288427 A1   10/2015 Wang et al.
(Continued)

FOREIGN PATENT DOCUMENTS

| CN | 1383337 A | 12/2002 |
|---|---|---|
| CN | 104717751 A | 6/2015 |

(Continued)

OTHER PUBLICATIONS

International Search Report and Written Opinion of PCT Application No. PCT/JP2020/010743, issued on Jun. 2, 2020, 09 pages of ISRWO.

(Continued)

*Primary Examiner* — Kevin D Mew
(74) *Attorney, Agent, or Firm* — CHIP LAW GROUP

(57) ABSTRACT

The present technology relates to a communication control apparatus and a method, and a wireless communication apparatus and a method that enable data that has failed to be demodulated to be retransmitted with higher reliability.

A communication control apparatus that functions as AP1 causes a first wireless communication apparatus that functions as AP2 to hold a Data signal including data, and causes the first wireless communication apparatus to operate to transmit the Data signal to a second wireless communication apparatus that functions as STA upon receipt of a transmission request. The present technology is applicable to a wireless communication system.

17 Claims, 18 Drawing Sheets

(58) Field of Classification Search
CPC . H04W 28/0867; H04W 28/10; H04W 28/12; H04W 28/14
See application file for complete search history.

(56) References Cited

U.S. PATENT DOCUMENTS

| | | | |
|---|---|---|---|
| 2016/0183305 A1 | 6/2016 | Huang | |
| 2018/0041990 A1* | 2/2018 | Venkatesan | H04B 7/0452 |
| 2019/0041509 A1* | 2/2019 | Jiang | H04W 24/10 |
| 2019/0132762 A1* | 5/2019 | Zhu | H04B 7/024 |
| 2019/0212724 A1* | 7/2019 | Phuyal | H04W 76/32 |
| 2019/0239202 A1* | 8/2019 | Bhattad | H04L 1/0003 |
| 2019/0273534 A1 | 9/2019 | Wang et al. | |
| 2020/0036618 A1* | 1/2020 | Asterjadhi | H04L 43/10 |
| 2020/0259529 A1 | 8/2020 | Wang et al. | |
| 2021/0211326 A1* | 7/2021 | Jiang | H04W 74/08 |
| 2023/0055895 A1* | 2/2023 | Sun | H04W 56/0035 |

FOREIGN PATENT DOCUMENTS

| | | | | |
|---|---|---|---|---|
| CN | 104904292 A | 9/2015 | | |
| CN | 107624236 A | 1/2018 | | |
| CN | 113348704 A | 9/2021 | | |
| EP | 1253736 A2 | 10/2002 | | |
| EP | 2918123 A1 | 9/2015 | | |
| EP | 3849099 A1 * | 7/2021 | | H04B 7/0626 |
| EP | 3897047 A1 | 10/2021 | | |
| EP | 3975650 A1 | 3/2022 | | |
| EP | 3998794 A1 * | 5/2022 | | H04B 7/024 |
| IL | 238655 A | 8/2020 | | |
| JP | 2003-324761 A | 11/2003 | | |
| JP | 2012-151629 A | 8/2012 | | |
| JP | 2016134649 A | 7/2016 | | |
| JP | 6371296 B2 | 8/2018 | | |
| KR | 10-2002-0083942 A | 11/2002 | | |
| KR | 10-2015-0082558 A | 7/2015 | | |
| MY | 177534 A | 9/2020 | | |
| WO | WO-2012077908 A1 | 6/2012 | | |
| WO | WO-2012126082 A1 * | 9/2012 | | H04L 1/1825 |
| WO | WO-2014061480 A1 | 4/2014 | | |
| WO | 2014/074919 A1 | 5/2014 | | |
| WO | WO-2018140177 A2 * | 8/2018 | | H04W 4/02 |
| WO | WO-2019141233 A1 * | 7/2019 | | G06F 21/32 |
| WO | WO-2019160741 A1 * | 8/2019 | | H04L 5/0048 |
| WO | 2020/152973 A1 | 7/2020 | | |
| WO | WO-2021081462 A2 * | 4/2021 | | H04B 7/0452 |

OTHER PUBLICATIONS

Ryu, et al., "Consideration on multi-AP coordination for EHT", IEEE 802.11-18/1982R1, XP068147487, Jan. 9, 2019, 10 pages.
Schelstraete, et al., "Joint Beamforming protocol simulation", IEEE 802.11-19/0092, XP068147711, Jan. 11. 2019, 16 pages.
Partial Supplementary European Search Report of EP Application No. 20778200.4 issued on Apr. 13, 2022, 17 pages.

* cited by examiner

*FIG. 16*

| Signal Type | Length | Hold Request ID | Hold Data Amount | Hold Period |
|---|---|---|---|---|

FIG. 17

| Signal Type | Length | Transmit Data ID | Transmit Scheme | Transmit Resource | Transmit time |

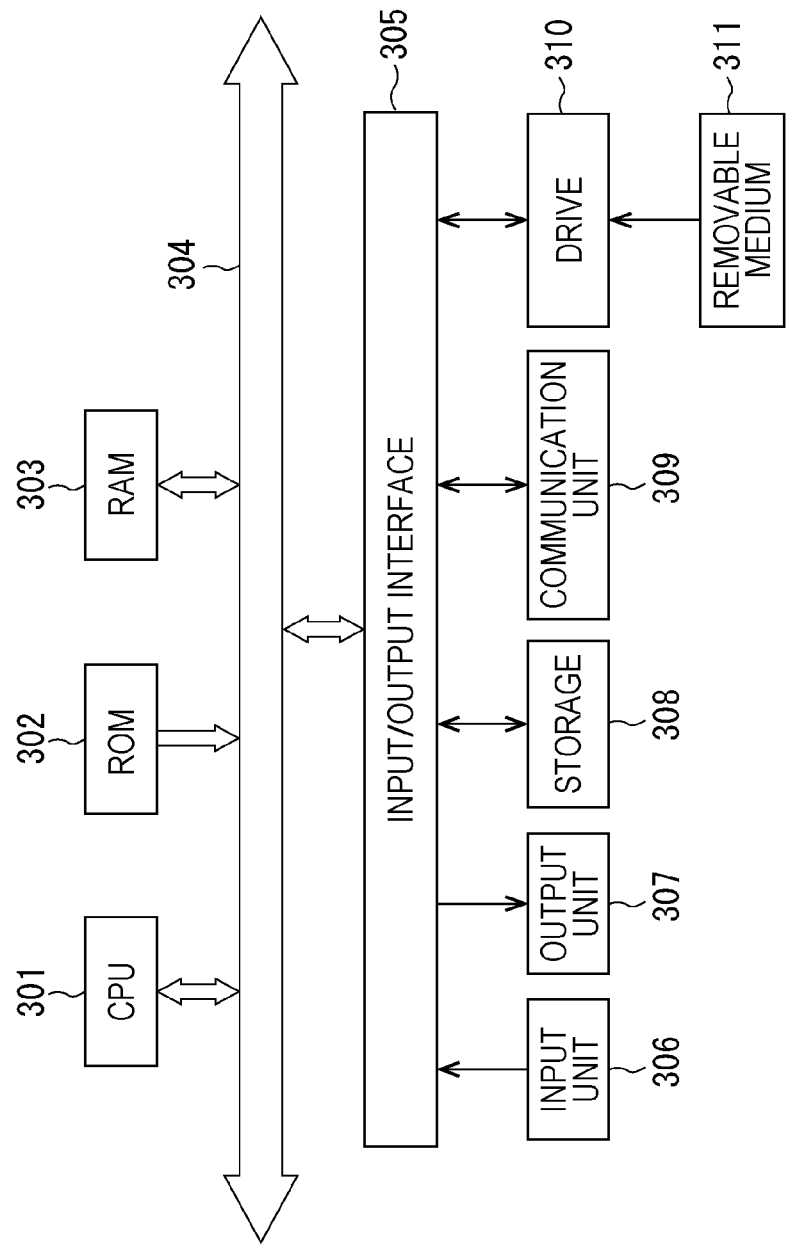

COMMUNICATION CONTROL APPARATUS AND METHOD, AND WIRELESS COMMUNICATION APPARATUS AND METHOD

CROSS REFERENCE TO RELATED APPLICATIONS

This application is a U.S. National Phase of International Patent Application No. PCT/JP2020/010743 filed on Mar. 12, 2020, which claims priority benefit of Japanese Patent Application No. JP 2019-058943 filed in the Japan Patent Office on Mar. 26, 2019. Each of the above-referenced applications is hereby incorporated herein by reference in its entirety.

TECHNICAL FIELD

The present technology relates to a communication control apparatus and a method, and a wireless communication apparatus and a method, and in particular, a communication control apparatus and a method, and a wireless communication apparatus and a method that enable data that has failed to be demodulated to be retransmitted with higher reliability.

BACKGROUND ART

In recent years, due to the spread of wireless devices, congestion of a wireless network has occurred. In a congested wireless network, there is a possibility of the occurrence of a failure in communication due to communication interference. Normally, in wireless communication, a transmitter transmits again (retransmits) a signal that a receiver has failed to receive, and therefore the quality of the communication is guaranteed.

It is conceivable that a retransmitted signal also fails to be received depending on a state of the receiver, and the quality of communication is not secured. Conceivable examples include a case where the receiver is receiving interference that the transmitter does not know, a case where the receiver has moved away from the transmitter, a case where a capability of the transmitter to control transmission power or a capability of the receiver to detect a signal is different from a capability that the transmitter has assumed so that a modulation scheme used in a signal is inappropriate, and other cases. Stated another way, a signal interference noise ratio (SINR) of the retransmitted signal is insufficient in some cases.

Patent Document 1 describes a method for establishing a new communication route by using another transmitter, and performing communication, in a case where communication through a certain communication route has failed in an ad-hoc network in which a plurality of devices is mutually connected.

CITATION LIST

Patent Document

Patent Document 1: Japanese Patent Application Laid-Open No. 2012-151629

SUMMARY OF THE INVENTION

Problems to be Solved by the Invention

However, in the technology of Patent Document 1, in switching communication routes, connection needs to be established, and overhead is generated in some cases. Furthermore, it is difficult to cope with a dynamic change.

The present technology has been created in view of such a situation, and the present technology enables data that has failed to be demodulated to be retransmitted with higher reliability.

Solutions to Problems

A communication control apparatus in a first aspect of the present technology includes a transmission control unit that causes a first wireless communication apparatus to hold a Data signal including data, and causes the first wireless communication apparatus to operate to transmit the Data signal to a second wireless communication apparatus upon receipt of a transmission request.

A wireless communication apparatus in a second aspect of the present technology includes a transmission unit that holds a Data signal including data, and transmits the Data signal upon receipt of a transmission request, on the basis of an instruction of a communication control apparatus.

A wireless communication apparatus in a third aspect of the present technology includes a demodulator that receives and demodulates a Data signal that has been transmitted from a communication control apparatus, and receives and demodulates information that has failed to be correctly demodulated, the information being at least part of information included in the Data signal that has been transmitted from at least one of the communication control apparatus or another wireless communication apparatus.

In the first aspect of the present technology, a Data signal including data is held by a first wireless communication apparatus, and the first wireless communication apparatus is caused to operate to transmit the Data signal to a second wireless communication apparatus upon receipt of a transmission request.

In the second aspect of the present technology, a Data signal including data is held, and the Data signal is transmitted upon receipt of a transmission request, on the basis of an instruction of a communication control apparatus.

In the third aspect of the present technology, a Data signal that has been transmitted from a communication control apparatus is received, and is demodulated. Then, information that has failed to be correctly demodulated, the information being at least part of information included in the Data signal that has been transmitted from at least one of the communication control apparatus or another wireless communication apparatus, is received, and is demodulated.

BRIEF DESCRIPTION OF DRAWINGS

FIG. 16 is a diagram illustrating an example of a configuration of a format of a frame in which an Initiation signal is stored.

FIG. 17 is a diagram illustrating an example of a configuration of a format of a frame in which a Trigger signal is stored.

FIG. 18 is a block diagram illustrating an example of a configuration of a computer.

MODES FOR CARRYING OUT THE INVENTION

Embodiments of the present technology are described below. Description will be provided in the order described below.

1. First Embodiment (Example of Unconstrained Topology)
2. Second Embodiment (Example of Constrained Topology)
3. Data Configuration
4. Others

1. First Embodiment (Example of Unconstrained Topology

Example of Configuration of Wireless Communication System

Figure 1:
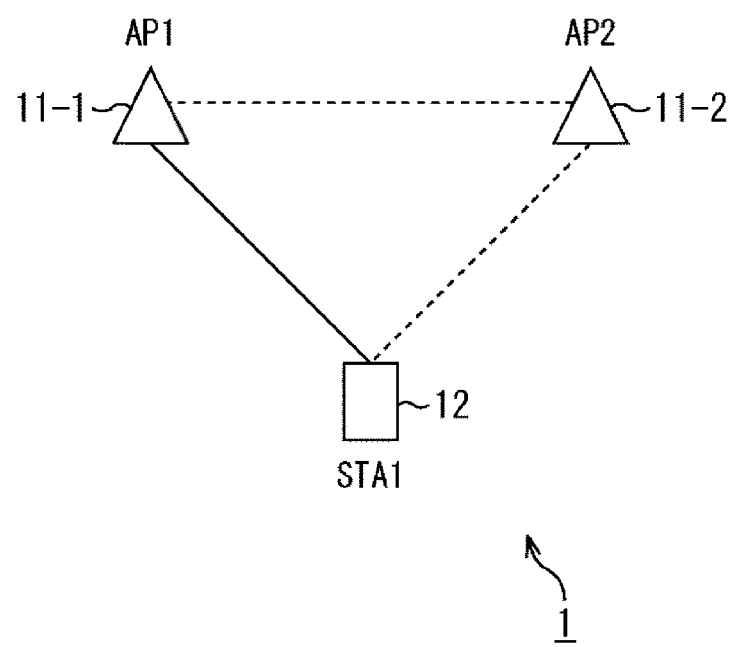
FIG. 1 is a diagram illustrating an example of a configuration of a wireless communication system according to a first embodiment of the present technology.

FIG. 1 is a diagram illustrating an example of a configuration of a wireless communication system according to a first embodiment of the present technology.

A wireless communication system 1 illustrated in FIG. 1 is configured by connecting a base station AP1, a base station AP2, and a terminal STA1 through wireless communication. The wireless communication system of FIG. 1 is an unconstrained topology wireless communication system in which each AP operates in an autonomous distributed manner and in cooperation with each other.

In the wireless communication system 1, the terminal STA1 is connected as a slave unit of the base station AP1. The base station AP1 and the base station AP2 have a mutually communicable positional relationship, and the base station AP2 and the terminal STA1 also have a mutually communicable positional relationship. In FIG. 1, a solid line indicates a state of connection through wireless communication, and a broken line indicates a state of a mutually communicable positional relationship.

Note that in the wireless communication system 1 of FIG. 1, only two base stations are connected. However, in practice, a plural number of base stations that is greater than or equal to two are connected. Furthermore, in the wireless communication system 1 of FIG. 1, the base station AP1 is not connected to a terminal, and the base station AP2 is connected to only one terminal. However, in practice, the base station AP1 is also connected to a terminal, and the number of terminals that the base station AP2 is connected to is not limited to one.

The base station AP1 includes a wireless communication apparatus 11-1. The base station AP2 includes a wireless communication apparatus 11-2. The terminal STA1 includes a wireless communication apparatus 12. Hereinafter, the base stations AP1 and AP2 are simply referred to as AP1 and AP2, and the terminal STA1 is simply referred to as STA1.

In a case where the wireless communication apparatuses 11-1 and 11-2 do not need to be distinguished from each other, the term "wireless communication apparatus 11" is used. Note that the wireless communication apparatuses 11 and 12 will be described later.

AP1 transmits an Initiation signal to AP2. The Initiation signal is a signal for causing AP2 to operate to hold a Data signal that AP1 has transmitted to STA1 and transmit the held Data signal to STA1 upon receipt of a transmission request from AP1.

After transmitting the Initiation signal, AP1 transmits a Data signal including data addressed to STA1. Upon receipt of information that has been transmitted from STA1 and relates to a result indicating success or failure in demodulation of the Data signal, AP1 transmits a Trigger signal to AP2. The Trigger signal is a signal that makes a request to transmit data to be retransmitted.

AP2 receives the Initiation signal, receives the Data signal on the basis of the received Initiation signal, and holds the Data signal. In the case of reception of the Trigger signal from AP1, AP2 transmits a Data signal including data that is indicated by the Trigger signal and that a request to transmit has been made, to STA1 on the basis of the Trigger signal.

STA1 receives the Data signal, and demodulates the Data signal to obtain data addressed to the local apparatus. STA1 transmits, to AP1, information relating to a result indicating success or failure in demodulation of the Data signal.

As described above, in the wireless communication system 1, AP2 is caused to hold a Data signal including data, and AP2 is caused to operate to transmit the Data signal upon receipt of a transmission request, and therefore the data is transmitted. By doing this, data that has failed to be demodulated on a reception side can be retransmitted with higher reliability.

Furthermore, AP1 also transmits data simultaneously with transmission performed by AP2, and therefore a diversity gain is obtained, and a high signal interference noise ratio (SINR) can be obtained on the reception side.

Example of Operation Sequence

Figure 2:
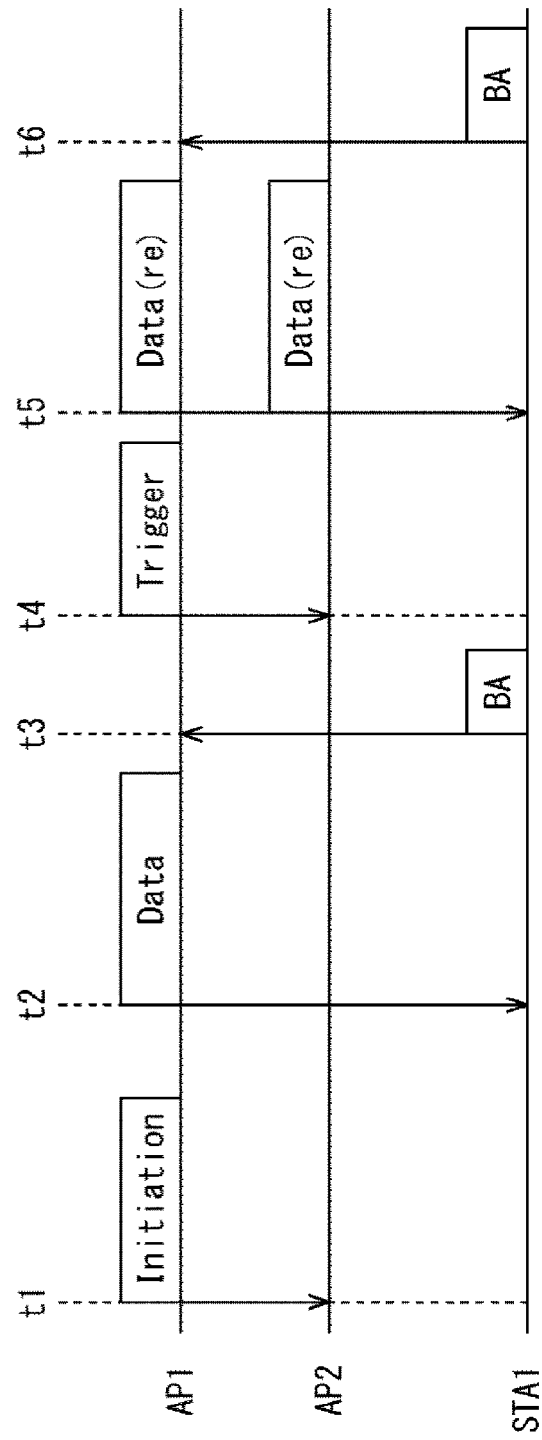
FIG. 2 is a diagram illustrating an example of an operation sequence of the wireless communication system of FIG. 1.

FIG. 2 is a diagram illustrating an example of an operation sequence of the wireless communication system 1.

FIG. 2 illustrates operation sequences of AP1 and AP2 serving as a plurality of base stations, and STA1 serving as a slave unit that is connected to AP1.

At time t1, AP1 transmits an Initiation signal to AP2. The Initiation signal includes holding information for causing AP2 to hold a Data signal.

The holding information may include holding ID for identifying a Data signal (described later) including data to be held. Furthermore, the holding information may include information relating to a type of data to be held, or may include information relating to an amount of data to be held. The information relating to an amount of data to be held may be reported by using a bit length or the number of bytes, or may be specified by the number of MAC protocol data units (MPDUs). The Initiation signal may include information relating to a period during which data is held.

AP2 receives the Initiation signal that has been transmitted from AP1. At this time, AP2 may transmit an Ack signal for confirming transmission in response to the Initiation signal.

After transmitting the Initiation signal, at time t2, AP1 transmits a Data signal including data addressed to STA1.

The Data signal may be transmitted a certain time period after the Initiation signal or the Ack signal, or may be transmitted after a short inter frame space (SIFS) defined by IEEE 802.11 has passed. The Data signal may include the holding information included in the Initiation signal. Stated another way, the Data signal may include information relating to a report indicating that data needs to be held, or may include information relating to holding ID reported by the Initiation signal. These pieces of holding information may be included in a physical header of the Data signal. The Data signal may include information relating to an amount and a type of data included in the Data signal, or may include information relating to an identifier of STA1.

The Data signal may include instruction information that causes STA1 to transmit information relating to a result indicating success or failure in demodulation to both AP1 and AP2. The instruction information may be included in Phy Header of the Data signal, or may be included in MAC Header.

STA1 receives the Data signal, and demodulates the Data signal to obtain data addressed to the local apparatus.

Note that when STA1 is receiving a Data signal, AP2 detects the Data signal addressed to STA1 that has been transmitted from AP1, on the basis of the content of the Initiation signal, and performs holding possibility determination to determine whether or not the detected Data signal will be held. AP2 holds the detected Data signal according to a result of holding possibility determination.

Holding possibility determination may be performed on the basis of information relating to a report indicating that data included in the Data signal needs to be held, or information relating to holding ID. Holding possibility determination may be performed on the basis of whether or not the Data signal includes an identifier of the local apparatus. Holding possibility determination may be performed on the basis of information included in a physical header of the Data signal. Note that in a case where it has been determined that holding will not be performed, reception of the Data signal may be stopped at a point in time of termination of reception of the physical header.

Thereafter, at time t3, STA1 transmits, to AP1, information relating to a result indicating success or failure in demodulation of the Data signal.

The information relating to success or failure in demodulation may be transmitted to AP2, or may be transmitted to both AP1 and AP2. The information relating to a result indicating success or failure in demodulation may be transmitted as a block ack (BA) signal including a block ack frame defined by IEEE 802.11.

AP1 receives the BA signal that has been transmitted from STA1. AP1 determines data to be retransmitted in the Data signal that is indicated by the BA signal and that STA1 has failed to demodulate. This determination is performed on the basis of information relating to an upper limit of the number of times of retransmission of data, information relating to an allowable delay time, or information relating to a discarding deadline. The information relating to an upper limit of the number of times of retransmission is information indicating an upper limit of the number of times of retransmission. The information relating to an allowable delay time is information indicating a delay time that can be allowed. The discarding deadline is information indicating a deadline for discarding held data.

AP1 transmits, to AP2, a Trigger signal that makes a request to transmit data to be retransmitted.

The Trigger signal includes information for causing data to be retransmitted to be transmitted. The Trigger signal includes information that identifies data serving as a target for a transmission request. The information that identifies the data may be a sequence number defined by IEEE 802.11. The information that identifies the data may include, for example, information relating to a different data sequence that is generated from data, such as a hybrid automatic repeat request (ARQ).

The Trigger signal may include information relating to a communication scheme. The information relating to a communication scheme is information relating to a modulation scheme, an encoding scheme, transmission power, or precoding.

The Trigger signal may include information relating to resources. The information relating to resources may include information relating to frequency resources, or may include information relating to a center frequency and a frequency bandwidth. The information relating to resources may include information relating to spatial stream resources, or may include information specifying a specified spatial stream. The information relating to resources may include information relating to non-orthogonal multiple access resources, or may include information relating to transmission power or information relating to an interleave pattern. The information relating to resources may include information reporting that the same resources have been allocated previously.

The Trigger signal may include information relating to a timing of transmission of data serving as a target for a transmission request.

AP2 receives the Trigger signal that has been transmitted from AP1. At time t5, AP2 that has received the Trigger signal transmits a Data signal including data that is indicated by the Trigger signal and that a request to transmit has been made, to STA1 according to a communication method and resources that are indicated by the Trigger signal. Note that Data(re) illustrated in FIG. 2 indicates retransmission of a Data signal.

AP2 may transmit the Data signal at a timing indicated by the Trigger signal. AP2 may transmit the Data signal a certain time period later, for example, at a timing indicated by the Trigger signal, at a timing of reception of the Trigger signal, or at another timing, or may transmit the Data signal after the SIFS defined by IEEE 802.11 has passed.

The Data signal may include information reporting that transmission has been performed on the basis of the Trigger signal.

In a case where the Trigger signal has not been received during a data holding period that is indicated by the Initiation signal, AP2 may discard held data.

On the other hand, AP1 that has transmitted the Trigger signal may transmit, to STA1, a Data signal including data that is indicated by the Trigger signal. The Data signal may be transmitted in a case where it has been determined that a probability of STA1 succeeding in reception of the Data signal will be improved by performing transmission simultaneously with AP2. The Data signal may be transmitted in a case where it fails to be confirmed that AP2 is holding data.

AP1 transmits the Data signal at the same timing as a timing indicated by the Trigger signal. The Data signal may be transmitted according to a communication method and resources that are indicated by the Trigger signal. The Data signal may include information reporting that a Data signal including the same data will be transmitted from another wireless communication apparatus (AP2) on the basis of the Trigger signal.

STA1 receives the Data signal, and demodulates the Data signal to obtain data addressed to the local apparatus. Thereafter, at time t6, STA1 transmits, to AP1, information relating to a result indicating success or failure in demodulation of the Data signal, for example, as a BA signal.

AP1 receives the BA signal that has been transmitted from STA1.

According to the sequence described above, data that has been transmitted from AP1 to STA1 and STA1 has failed to demodulate can be transmitted to STA1 again with higher reliability.

Furthermore, in a case where a communication environment between AP1 and STA1 has deteriorated, transmission can be performed again by using communication between AP2 and STA1 in a good environment.

Moreover, by performing transmission again from each of AP1 and AP2 to STA1, a diversity gain is obtained, and a high SINR can be obtained.

Furthermore, AP2 receives and holds a Data signal that AP1 has transmitted to STA1. Therefore, AP1 and AP2 can simultaneously perform transmission to STA1 without performing communication that aims at sharing, and in other words, without overhead.

Note that before the sequence of FIG. 2 is started, respective wireless communication apparatuses may mutually perform function correspondence checking for checking whether or not functions correspond to the sequence of the present technology.

Example of Configuration of Apparatus

Figure 3:
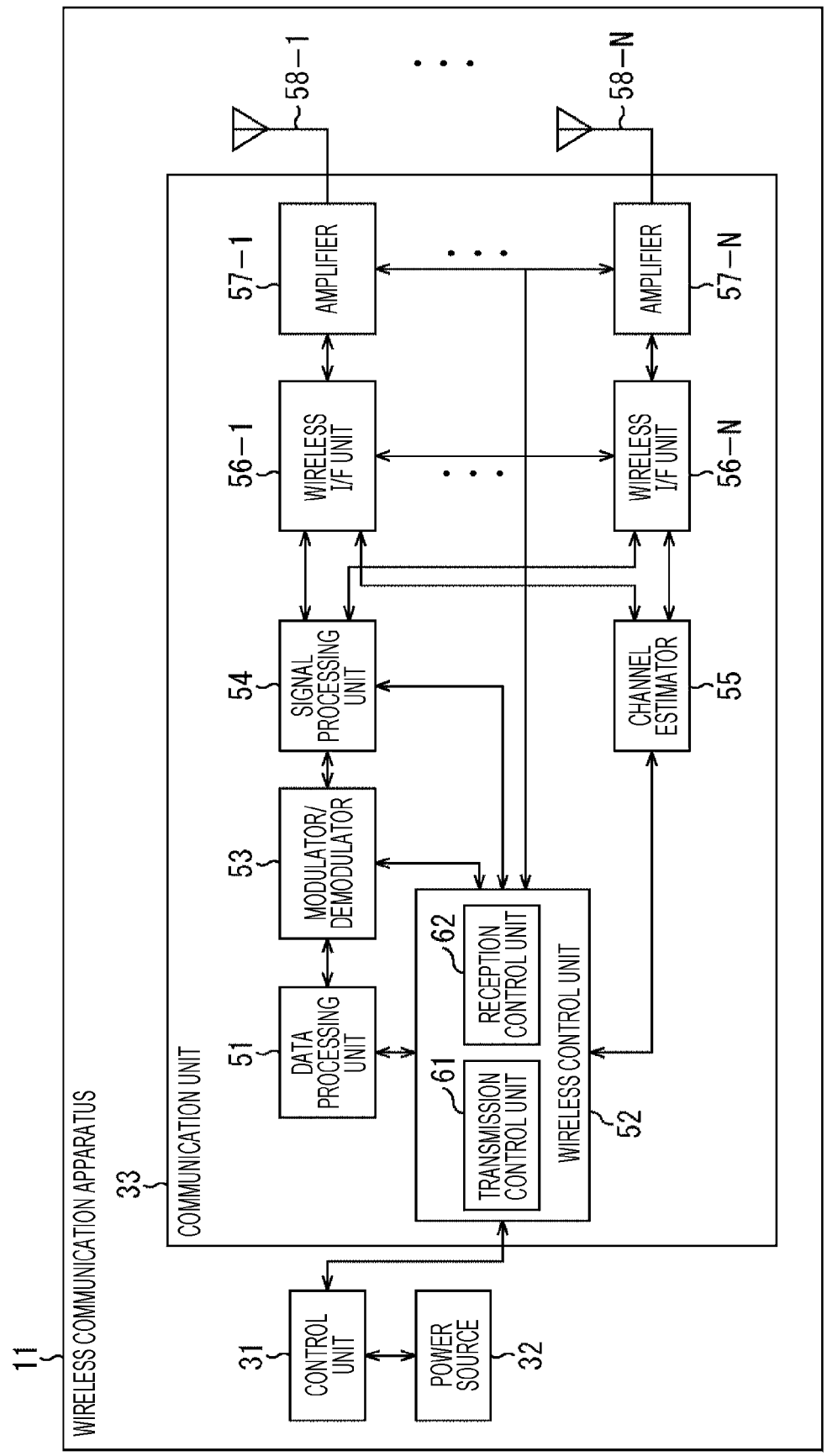
FIG. 3 is a block diagram illustrating an example of a configuration of a wireless communication apparatus.

FIG. 3 is a block diagram illustrating an example of a configuration of a wireless communication apparatus 11.

The wireless communication apparatus 11 illustrated in FIG. 3 is an apparatus that operates as AP.

The wireless communication apparatus 11 includes a control unit 31, a power source 32, and a communication unit 33. The communication unit 33 may be implemented as an LSI.

The communication unit 33 transmits and receives data. The communication unit 33 includes a data processing unit 51, a wireless control unit 52, a modulator/demodulator 53, a signal processing unit 54, a channel estimator 55, wireless interface (I/F) units 56-1 to 56-N, amplifiers 57-1 to 57-N, and antennas 58-1 to 58-N.

From among the wireless I/F units 56-1 to 56-N, the amplifiers 57-1 to 57-N, and the antennas 58-1 to 58-N, respective units that have the same branch number may form a single set, and each of one or more sets may serve as a component. Note that functions of the amplifiers 57-1 to 57-N may be included in the wireless I/F units 56-1 to 56-N.

Note that hereinafter, in a case where the wireless I/F units 56-1 to 56-N, the amplifiers 57-1 to 57-N, and the antennas 58-1 to 58-N do not need to be distinguished from each other, the terms "wireless I/F unit 56", "amplifier 57", and "antenna 58" are appropriately used.

The control unit 31 includes a central processing unit (CPU), a read only memory (ROM), a random access memory (RAM), or the like. The control unit 31 executes a program stored in the ROM or the like, and controls the power source 32 and the wireless control unit 52.

The power source 32 includes a battery power source or a fixed power source, and supplies power to the entirety of the wireless communication apparatus 11.

At the time of transmission, the data processing unit 51 generates a packet for wireless transmission by using data supplied from an upper layer. The data processing unit 51 performs processing, such as addition of a header for media access control (MAC) or addition of an error detection code, on the generated packet, and outputs data after processing to the modulator/demodulator 53.

At the time of reception, the data processing unit 51 performs analysis of a MAC header, detection of a packet error, reordering processing, or the like on data supplied from the modulator/demodulator 53, and outputs data after processing to an upper layer of the local unit.

The wireless control unit 52 transfers information among respective units of the wireless communication apparatus 11, and controls respective units in the communication unit 33. The wireless control unit 52 includes a transmission control unit 61 and a reception control unit 62.

At the time of transmission, the transmission control unit 61 sets a parameter in the modulator/demodulator 53 and the signal processing unit 54, performs packet scheduling in the data processing unit 51, sets a parameter in the wireless I/F unit 56 and the amplifier 57, or controls transmission power, as needed. At the time of reception, the reception control unit 62 sets a parameter in the modulator/demodulator 53 and the signal processing unit 54, or sets a parameter in the wireless I/F unit 56 and the amplifier 57, as needed.

In a case where the wireless communication apparatus 11 is AP1 (the wireless communication apparatus 11-1), the transmission control unit 61 controls respective units to transmit an Initiation signal to AP2. The transmission control unit 61 controls respective units to transmit a Data signal to STA1. The transmission control unit 61 controls respective units to transmit a Trigger signal to AP2. The reception control unit 62 controls respective units to receive a BA signal that has been transmitted from STA1.

In a case where the wireless communication apparatus 11 is AP2 (the wireless communication apparatus 11-2), the reception control unit 62 controls respective units to hold a Data signal addressed to STA1 that has been transmitted from AP1, and receive an Initiation signal that has been transmitted from AP1. The transmission control unit 61 controls respective units to transmit a held Data signal on the basis of the Initiation signal.

Note that at least some operations of these operations of the wireless control unit 52 may be performed by the control unit 31 instead of the wireless control unit 52. Furthermore, the control unit 31 and the wireless control unit 52 may be configured as a single block.

At the time of transmission, the modulator/demodulator 53 performs encoding, interleaving, and modulation on data supplied from the data processing unit 51, on the basis of an encoding scheme and a modulation scheme that have been set by the control unit 31, and generates a data symbol stream. The modulator/demodulator 53 outputs the generated data symbol stream to the signal processing unit 54.

At the time of reception, the modulator/demodulator 53 outputs, to the data processing unit 51 or the wireless control unit 52, data obtained as a result of performing demodulation, deinterleaving, and decoding on a data symbol stream supplied from the signal processing unit 54.

At the time of transmission, the signal processing unit 54 performs signal processing for spatial separation on a data symbol stream supplied from the modulator/demodulator 53, as needed, and outputs one or more transmission symbol streams obtained as a result of signal processing to each of the wireless I/F units 56.

At the time of reception, the signal processing unit 54 performs signal processing on a reception symbol stream supplied from each of the wireless I/F units 56. Furthermore, the signal processing unit 54 performs spatial separation on the stream, as needed, and outputs a data symbol stream obtained as a result of spatial separation to the modulator/demodulator 53.

The channel estimator 55 calculates complex channel gain information indicating a complex channel gain of a propagation path from a preamble portion and a training signal portion of a reception symbol stream supplied from each of the wireless I/F units 56. The complex channel gain information is supplied to the modulator/demodulator 53 and the signal processing unit 54 via the wireless control unit 52, and is used in demodulation processing in the modulator/demodulator 53 and spatial separation processing in the signal processing unit 54.

At the time of transmission, the wireless I/F unit 56 converts a transmission symbol stream from the signal processing unit 54 into an analog signal, performs filtering, up-converting into a frequency of a carrier, and phase control, and outputs an analog signal after phase control to the amplifier 57.

At the time of reception, the wireless I/F unit 56 performs phase control, down-converting, and inverse filtering on an analog signal supplied from the amplifier 57, and outputs a reception symbol stream obtained as a result of conversion into a digital signal to the signal processing unit 54 and the channel estimator 55.

At the time of transmission, the amplifier 57 amplifies an analog signal supplied from the wireless I/F unit 56 to a predetermined power, and outputs the analog signal for which power has been amplified to the antenna 58. At the time of reception, the amplifier 57 amplifies an analog signal supplied from the antenna 58 to a predetermined power, and outputs the analog signal for which power has been amplified to the wireless I/F unit 56.

The wireless I/F unit 56 may include at least some of at least either functions at the time of transmission or functions at the time of reception from among functions of the amplifier 57. At least some of at least either the functions at the time of transmission or the functions at the time of reception from among the functions of the amplifier 57 may serve as components outside the communication unit 33.

Note that a configuration of the wireless communication apparatus 12 that operates as STA1 is a configuration that is basically similar to a configuration of the wireless communication apparatus 11. Hereinafter, the configuration of the wireless communication apparatus 12 is described by appropriately citing the configuration of the wireless communication apparatus 11.

In a case where the configuration of the wireless communication apparatus 12 is described, the reception control unit 62 controls respective units to receive and demodulate a Data signal that has been transmitted from AP1. The transmission control unit 61 controls respective units to transmit, to AP1, information relating to a result indicating success or failure in demodulation of the Data signal as a BA signal.

<Processing of Wireless Communication Apparatus 11-1 (AP1)>

Figure 4:
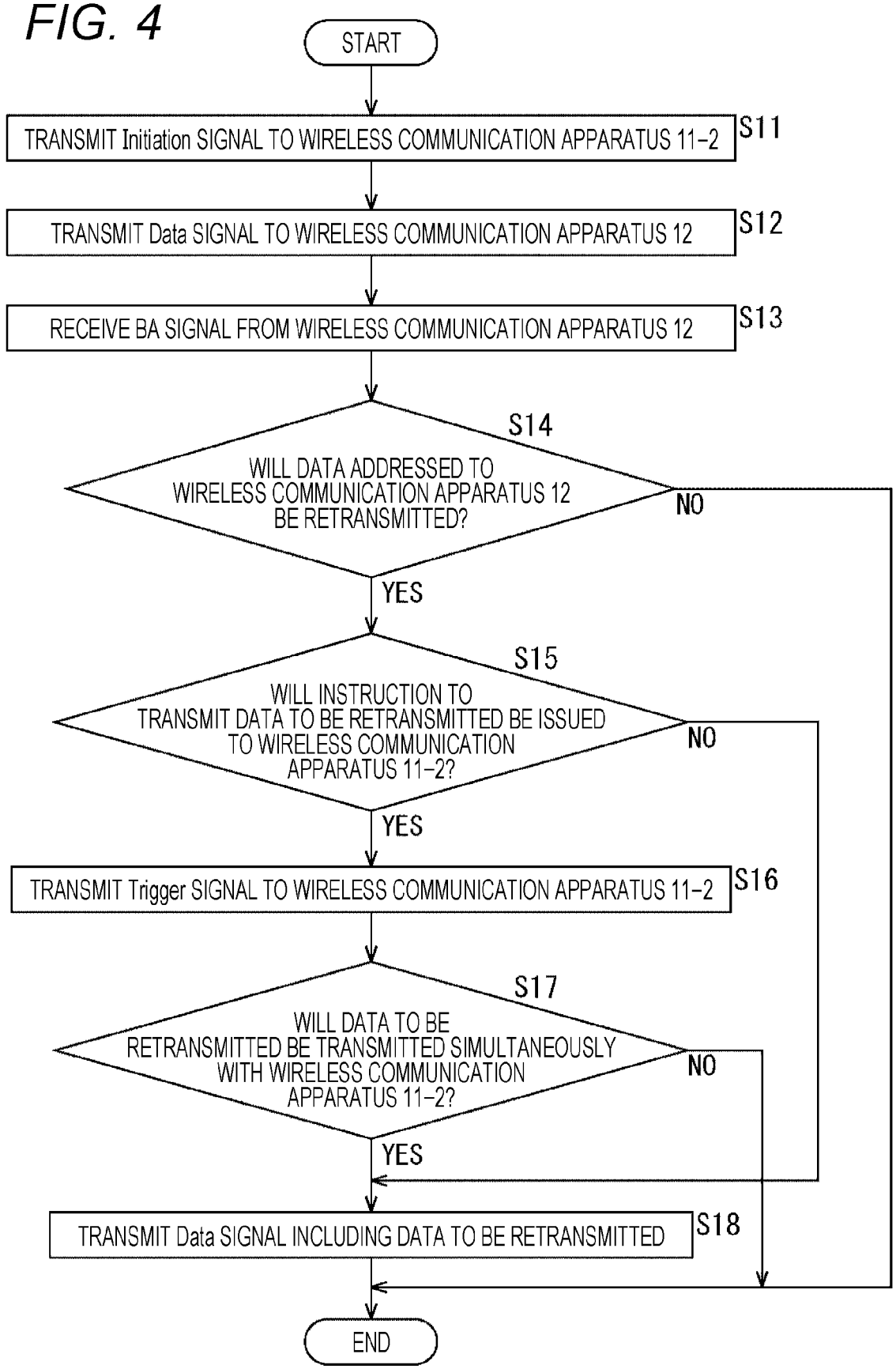
FIG. 4 is a flowchart explaining communication processing of a wireless communication apparatus that operates as AP1.

FIG. 4 is a flowchart explaining communication processing of the wireless communication apparatus 11-1 that operates as AP1.

In step S11, the transmission control unit 61 of the wireless communication apparatus 11-1 controls respective units of the communication unit 33 to transmit an Initiation signal to the wireless communication apparatus 11-2.

In step S12, the transmission control unit 61 controls respective units of the communication unit 33 to transmit a Data signal to the wireless communication apparatus 12.

The wireless communication apparatus 12 that has received the Data signal transmits, to the wireless communication apparatus 11-1, a BA signal in response to the Data signal (step S32 in FIG. 5 described later).

In step S13, the reception control unit 62 controls respective units of the communication unit 33 to receive the BA signal that has been transmitted from the wireless communication apparatus 12.

In step S14, the transmission control unit 61 determines whether or not data addressed to the wireless communication apparatus 12 will be retransmitted, on the basis of the BA signal. In a case where it has been determined in step S14 that data addressed to the wireless communication apparatus 12 will be retransmitted, the processing moves on to step S15.

In step S15, the transmission control unit 61 determines whether or not an instruction to transmit data to be retransmitted will be issued to the wireless communication apparatus 11-2. In a case where it has been determined in step S15 that an instruction to transmit data to be retransmitted will be issued to the wireless communication apparatus 11-2, the processing moves on to step S16.

In step S16, the transmission control unit 61 transmits a Trigger signal to the wireless communication apparatus 11-2.

In step S17, the transmission control unit 61 determines whether or not data to be retransmitted will be transmitted simultaneously with the wireless communication apparatus 11-2. In a case where it has been determined in step S17 that data to be retransmitted will be transmitted simultaneously with the wireless communication apparatus 11-2, the processing moves on to step S18.

Furthermore, in a case where it has been determined in step S15 that an instruction to transmit data to be retransmitted will not be issued to the wireless communication apparatus 11-2, the processing moves on to step S18.

In step S18, the transmission control unit 61 controls respective units of the communication unit 33 to transmit, to the wireless communication apparatus 12, a Data signal including data to be retransmitted.

After the Data signal including data to be retransmitted has been transmitted to the wireless communication apparatus 12 in step S18, the communication processing of the wireless communication apparatus 11-1 is terminated.

Furthermore, similarly in a case where it has been determined in step S14 that data addressed to the wireless communication apparatus 12 will not be retransmitted and in a case where it has been determined in step S17 that data to be retransmitted will not be transmitted simultaneously with the wireless communication apparatus 11-2, the communication processing of the wireless communication apparatus 11-1 is terminated.

<Processing of Wireless Communication Apparatus 12 (STA1)>

Figure 5:
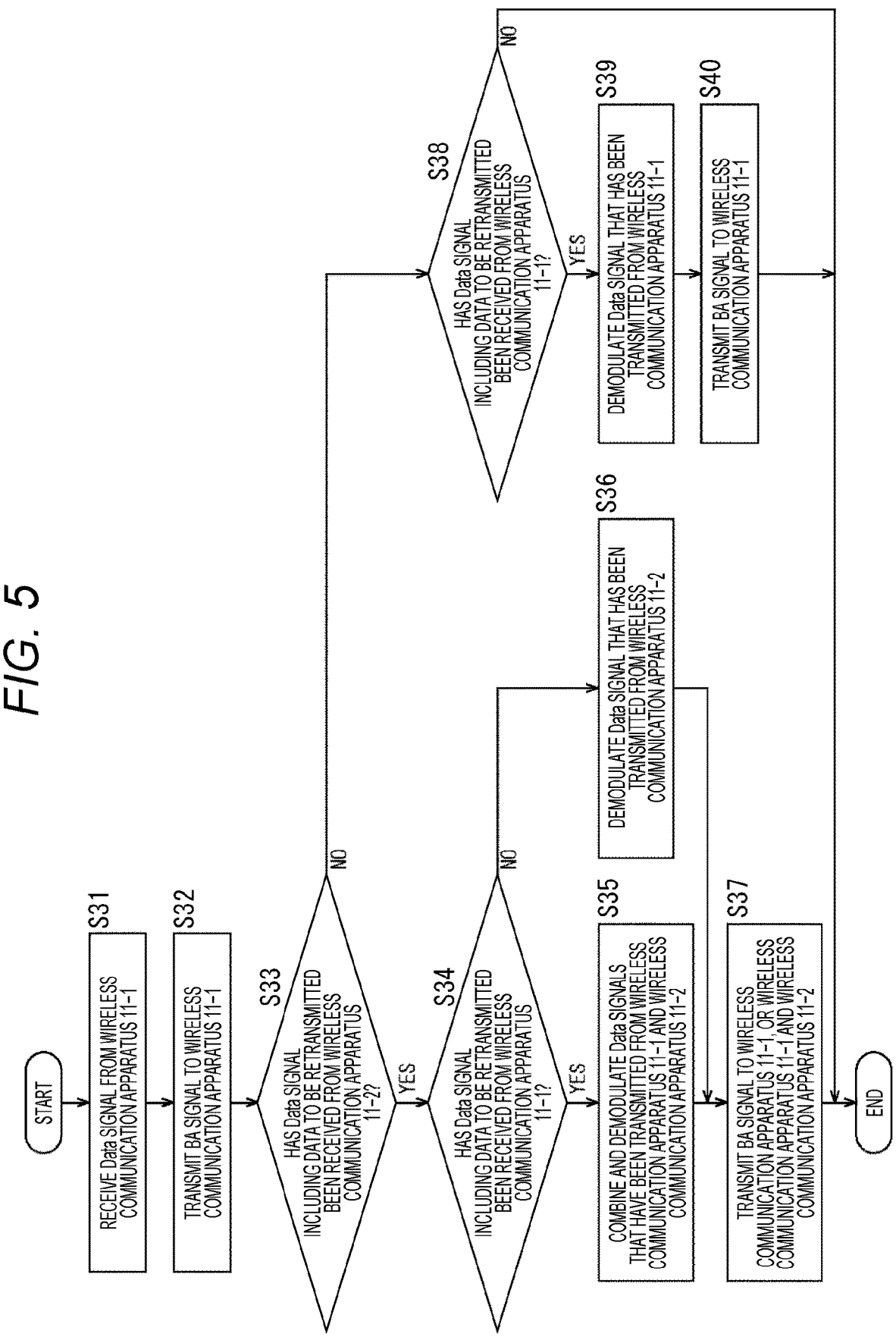
FIG. 5 is a flowchart explaining communication processing of a wireless communication apparatus that operates as STA1.

FIG. 5 is a flowchart explaining communication processing of the wireless communication apparatus 12 that operates as STA1.

The wireless communication apparatus 11-1 transmits a Data signal to the wireless communication apparatus 12 (step S12 in FIG. 4).

In step S31, the reception control unit 62 of the wireless communication apparatus 12 controls respective units of the communication unit 33 to receive the Data signal that has been transmitted from the wireless communication apparatus 11-1.

In step S32, the transmission control unit 61 controls respective units of the communication unit 33 to transmit a BA signal to the wireless communication apparatus 11-1.

The wireless communication apparatus 11-1 transmits, to the wireless communication apparatus 12, a Data signal including data to be retransmitted (step S18 in FIG. 4). Furthermore, the wireless communication apparatus 11-2 transmits, to the wireless communication apparatus 12, a Data signal including data to be retransmitted (step S65 in FIG. 6).

In step S33, the reception control unit 62 determines whether or not the Data signal that includes data to be retransmitted and has been transmitted from the wireless communication apparatus 11-2 has been received. In a case where it has been determined in step S33 that the Data signal that includes data to be retransmitted and has been transmitted from the wireless communication apparatus 11-2 has been received, the processing moves on to step S34.

In step S34, the reception control unit 62 determines whether or not the Data signal that includes data to be retransmitted and has been transmitted from the wireless communication apparatus 11-1 has been received. In a case where it has been determined in step S34 that the Data signal that includes data to be retransmitted and has been transmitted from the wireless communication apparatus 11-1 has been received, the processing moves on to step S35.

In step S35, the modulator/demodulator 53 combines and demodulates the Data signals that have been transmitted from the wireless communication apparatuses 11-1 and 11-2.

In a case where it has been determined in step S34 that the Data signal that includes data to be retransmitted and has been transmitted from the wireless communication apparatus 11-1 has not been received, the processing moves on to step S36.

In step S36, the modulator/demodulator 53 demodulates the Data signal that has been transmitted from the wireless communication apparatus 11-2.

After the Data signal has been demodulated in step S35 or step S36, the processing moves on to step S37.

In step S37, the transmission control unit 61 transmits a BA signal to the wireless communication apparatus 11-1 or the wireless communication apparatuses 11-1 and 11-2.

On the other hand, in a case where it has been determined in step S33 that the Data signal that includes data to be retransmitted and has been transmitted from the wireless communication apparatus 11-2 has not been received, the processing moves on to step S38.

In step S38, the reception control unit 62 determines whether or not the Data signal that includes data to be retransmitted and has been transmitted from the wireless communication apparatus 11-1 has been received. In a case where it has been determined in step S38 that the Data signal that includes data to be retransmitted and has been transmitted from the wireless communication apparatus 11-1 has been received, the processing moves on to step S39.

In step S39, the modulator/demodulator 53 demodulates the Data signal that has been transmitted from the wireless communication apparatus 11-1.

In step S40, the transmission control unit 61 transmits a BA signal to the wireless communication apparatus 11-1.

After the BA signal has been transmitted in step S37 or S40, the communication processing of the wireless communication apparatus 12 is terminated. Furthermore, similarly in a case where it has been determined in step S38 that the Data signal that includes data to be retransmitted and has been transmitted from the wireless communication apparatus 11-1 has not been received, the communication processing of the wireless communication apparatus 12 is terminated.

<Processing of Wireless Communication Apparatus 11-2 (AP2)>

Figure 6:
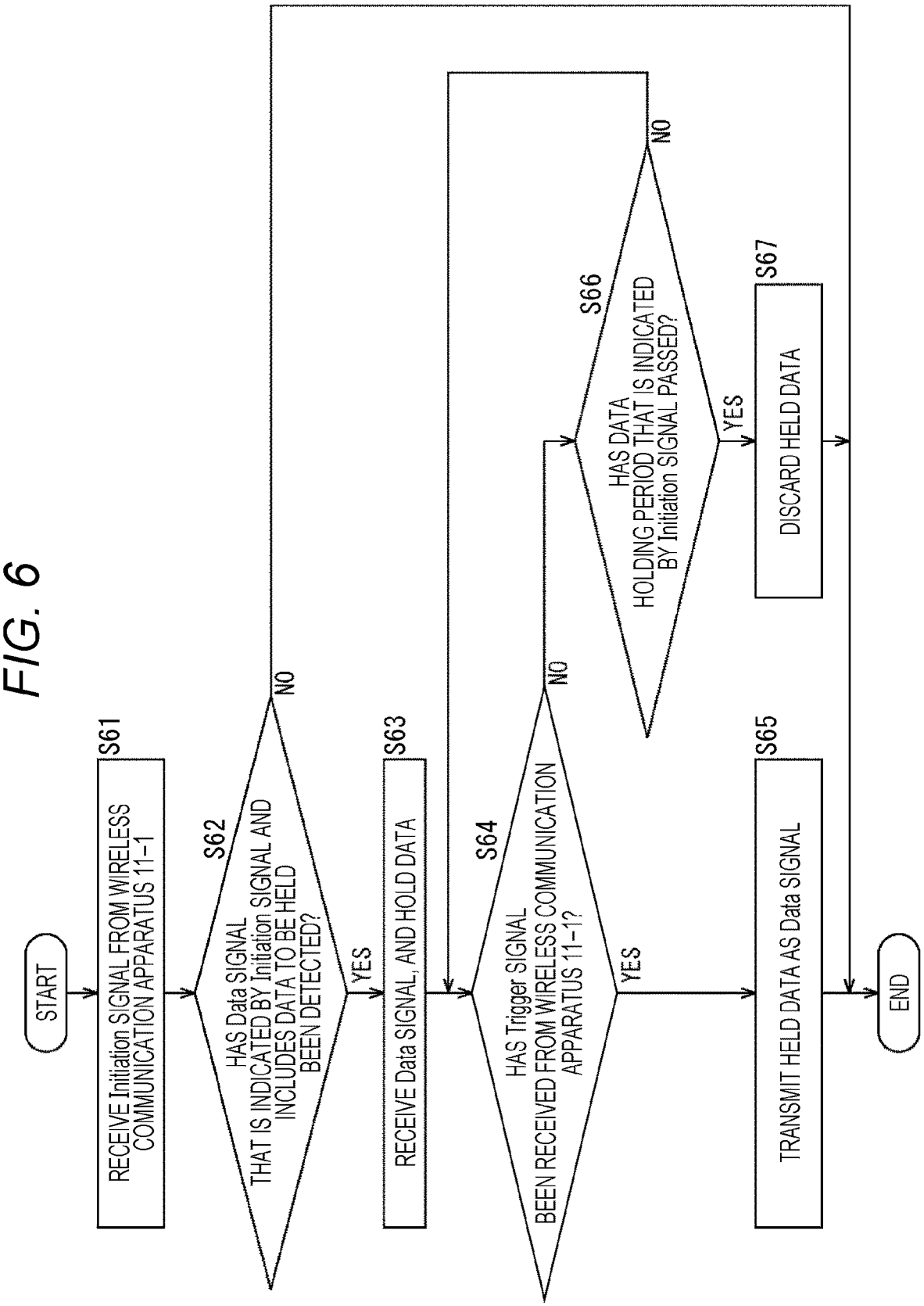
FIG. 6 is a flowchart explaining communication processing of a wireless communication apparatus that operates as AP2.

FIG. 6 is a flowchart explaining communication processing of the wireless communication apparatus 11-2 that operates as AP2.

The wireless communication apparatus 11-1 transmits an Initiation signal to the wireless communication apparatus 11-2 (step S11 in FIG. 4).

In step S61, the reception control unit 62 of the wireless communication apparatus 11-2 receives the Initiation signal that has been transmitted from the wireless communication apparatus 11-1.

In step S62, the reception control unit 62 determines whether or not a Data signal that is indicated by the Initiation signal and includes data to be held has been detected. In a case where it has been determined in step S62 that the Data signal that is indicated by the Initiation signal and includes data to be held has been detected, the processing moves on to step S63.

In step S63, the reception control unit 62 receives the Data signal, and holds data included in the received Data signal.

The wireless communication apparatus 11-1 transmits a Trigger signal to the wireless communication apparatus 11-2 (step S16 in FIG. 4).

In step S64, the reception control unit 62 determines whether or not the Trigger signal has been received from the wireless communication apparatus 11-1. In a case where it has been determined in step S64 that the Trigger signal has been received from the wireless communication apparatus 11-1, the processing moves on to step S65.

In step S65, the transmission control unit 61 transmits, to the wireless communication apparatus 12, held data as a Data signal including data to be retransmitted.

On the other hand, in a case where it has been determined in step S64 that the Trigger signal has not been received from the wireless communication apparatus 11-1, the processing moves on to step S66.

In step S66, the reception control unit 62 determines whether or not a holding period that is indicated by the Initiation signal and serves as a period during which data is held has passed. In a case where it has been determined in step S66 that a data holding period that is indicated by the Initiation signal has passed, the processing moves on to step S67.

In step S67, the reception control unit 62 discards held data.

In a case where it has been determined in step S66 that a data holding period that is indicated by the Initiation signal has not passed, the processing returns to step S64, and the process of step S64 and processes that follow are repeated.

After the Data signal has been transmitted in step S65 and after data has been discarded in step S67, the communication processing of the wireless communication apparatus 11-2 is terminated. Furthermore, similarly in a case where it has been determined in step S62 that a Data signal that is indicated by the Initiation signal and includes data to be held has not been detected, the communication processing of the wireless communication apparatus 11-2 is terminated.

Another Example of Operation Sequence

Figure 7:
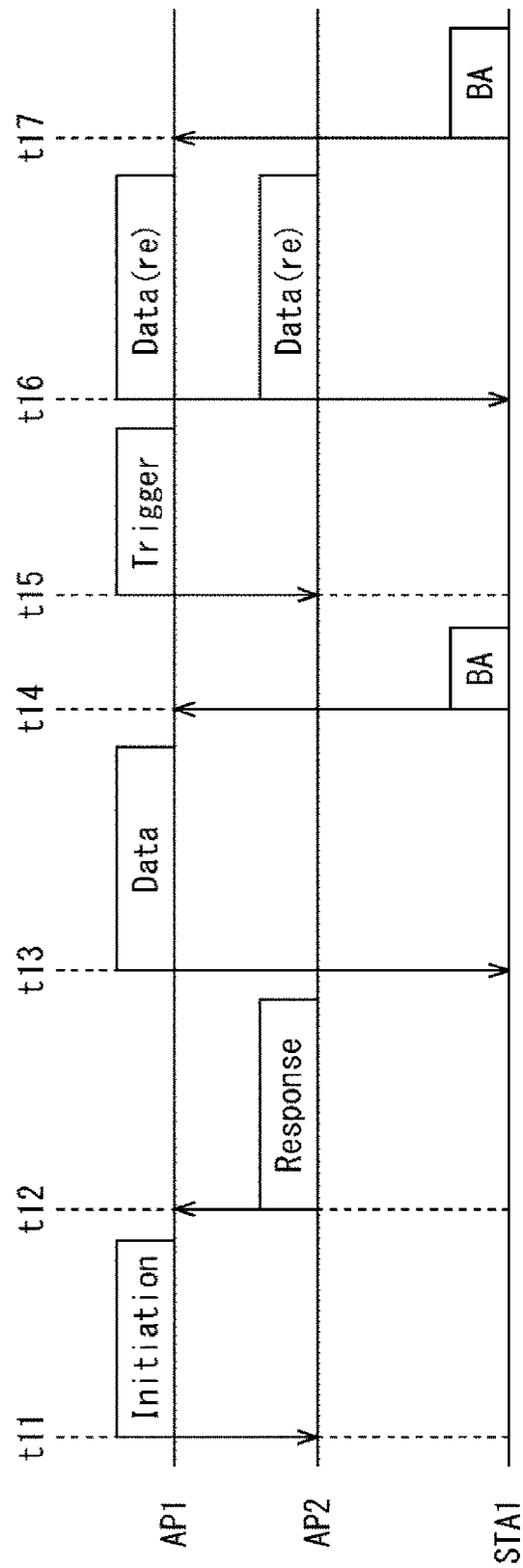
FIG. 7 is a diagram illustrating another example of the operation sequence of the wireless communication system.

FIG. 7 is a diagram illustrating another example of the operation sequence of the wireless communication system 1.

An operation relating to an Initiation signal in the sequence of FIG. 7 is the same as an operation relating to an Initiation signal in the sequence of FIG. 2.

At time t11, AP1 transmits an Initiation signal to AP2.

AP2 receives the Initiation signal that has been transmitted from AP1. In FIG. 7, at time t12, AP2 transmits a Response signal in response to the Initiation signal.

The Response signal may include a type of data that can be held, or may include information relating to an amount of data that can be held.

The Response signal may include prevention information that prevents transmission performed by a wireless communication apparatus under control that is connected to the local apparatus, and a wireless communication apparatus that is different from the wireless communication apparatus 11-1 or the wireless communication apparatus 12. The prevention information may include period information indicating a period of prevention in order to prevent transmission until the termination of transmission of a Data signal to be transmitted from the wireless communication apparatus 11-1 or a BA signal to be transmitted from the wireless communication apparatus 12.

The Response signal may be transmitted a certain time period after the Initiation signal, or may be transmitted after an SIFS defined by IEEE 802.11 has passed.

AP1 receives the Response signal from AP2. At time t13, AP1 transmits a Data signal including data addressed to STA1. An operation that follows is an operation that is similar to the sequence of FIG. 2, and therefore a detailed description is omitted.

STA1 receives the Data signal, and demodulates the Data signal to obtain data addressed to the local apparatus.

Note that at this time, AP2 detects the Data signal addressed to STA1 that has been transmitted from AP1 on the basis of the content of the Initiation signal, and performs holding possibility determination to determine whether or not the detected Data signal will be held. AP2 holds the detected Data signal according to a result of holding possibility determination.

Thereafter, at time t14, STA1 transmits, to AP1, information relating to a result indicating success or failure in demodulation of the Data signal as a BA signal.

AP1 receives the BA signal that has been transmitted from STA1. AP1 determines data to be retransmitted in the Data signal that is indicated by the BA signal and that STA1 has failed to demodulate.

At time t15, AP1 transmits, to AP2, a Trigger signal that makes a request to transmit data to be retransmitted.

AP2 receives the Trigger signal that has been transmitted from AP1. At time t16, AP2 that has received the Trigger signal transmits a Data signal including data that is indicated by the Trigger signal and that a request to transmit has been made, to STA1 according to a communication method and resources that are indicated by the Trigger signal.

At time t16, AP1 that has transmitted the Trigger signal also transmits, to STA1, a Data signal including the data that is indicated by the Trigger signal.

STA1 receives the Data signal, and demodulates the Data signal to obtain data addressed to the local apparatus.

Thereafter, at time t17, STA1 transmits, to AP1, information relating to a result indicating success or failure in demodulation of the Data signal, for example, as a BA signal.

AP1 receives the BA signal that has been transmitted from STA1.

The sequence described above can prevent a situation where STA1 fails to receive a Data signal due to other communication or the like, in transmitting the Data signal from AP1 to STA1. Accordingly, STA1 can reliably receive a Data signal.

Another Example of Operation Sequence

Figure 8:
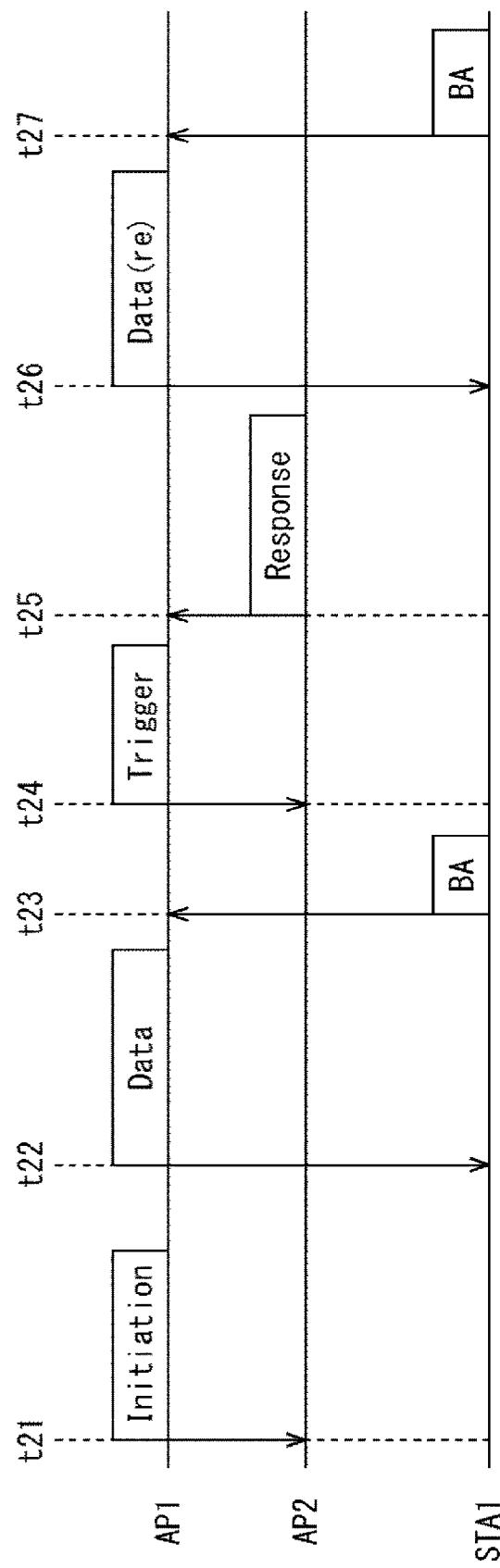
FIG. 8 is a diagram illustrating yet another example of the operation sequence of the wireless communication system.

FIG. 8 is a diagram illustrating yet another example of the operation sequence of the wireless communication system 1.

An operation before transmission of a Trigger signal in the sequence of FIG. 8 is the same as an operation before transmission of a Trigger signal in the sequence of FIG. 2.

At time t21, AP1 transmits an Initiation signal to AP2.

AP2 receives the Initiation signal that has been transmitted from AP1.

At time t22, AP1 transmits a Data signal including data addressed to STA1.

STA1 receives the Data signal, and demodulates the Data signal to obtain data addressed to the local apparatus. At this time, AP2 receives and holds the Data signal addressed to STA1 that has been transmitted from AP1, on the basis of the content of the Initiation signal.

Thereafter, at time t23, STA1 transmits, to AP1, information relating to a result indicating success or failure in demodulation of the Data signal as a BA signal.

AP1 receives the BA signal that has been transmitted from STA1. AP1 determines data to be retransmitted in the Data signal that is indicated by the BA signal and that STA1 has failed to demodulate. At time t24, AP1 transmits, to AP2, a Trigger signal that makes a request to transmit data to be retransmitted.

AP2 receives the Trigger signal that has been transmitted from AP1. At time t25, AP2 that has received the Trigger signal transmits a Response signal to AP1.

The Response signal is a signal reporting whether or not AP2 is holding data included in the Data signal that has been transmitted from AP1 to STA1. The Response signal is transmitted from AP2 after transmission of the Trigger signal and before transmission of a Data signal to be transmitted from AP1 to STA1.

AP1 receives the Response signal that has been transmitted from AP2. AP1 determines a transmission method and transmission resources of a Data signal that will be transmitted to STA1 and includes data, on the basis of a report that is included in the Response signal and indicates whether or not data is being held. In a case where it has been reported that AP2 is not holding data, AP1 determines a transmission method and transmission resources that are different from a transmission method and transmission resources under the assumption that a Data signal including the same data will be transmitted from AP2.

At time t26, AP1 transmits a Data signal to STA1.

STA1 receives and demodulates the Data signal that has been transmitted from AP1. At time t27, SAT1 transmits, to AP1, information relating to a result indicating success or failure in demodulation of the Data signal as a BA signal.

AP1 receives the BA signal that has been transmitted from STA1.

The sequence described above can prevent a situation where, in a case where AP2 is not holding data, AP1 performs transmission by using a transmission method and transmission resources under the assumption that a Data signal including the same data will be transmitted from AP2.

Furthermore, transmission can be performed without using precoding under the assumption that a Data signal including the same data will be transmitted from AP2, and therefore STA1 can perform demodulation by only using a Data signal that has been transmitted from AP1.

Another Example of Operation Sequence

Figure 9:
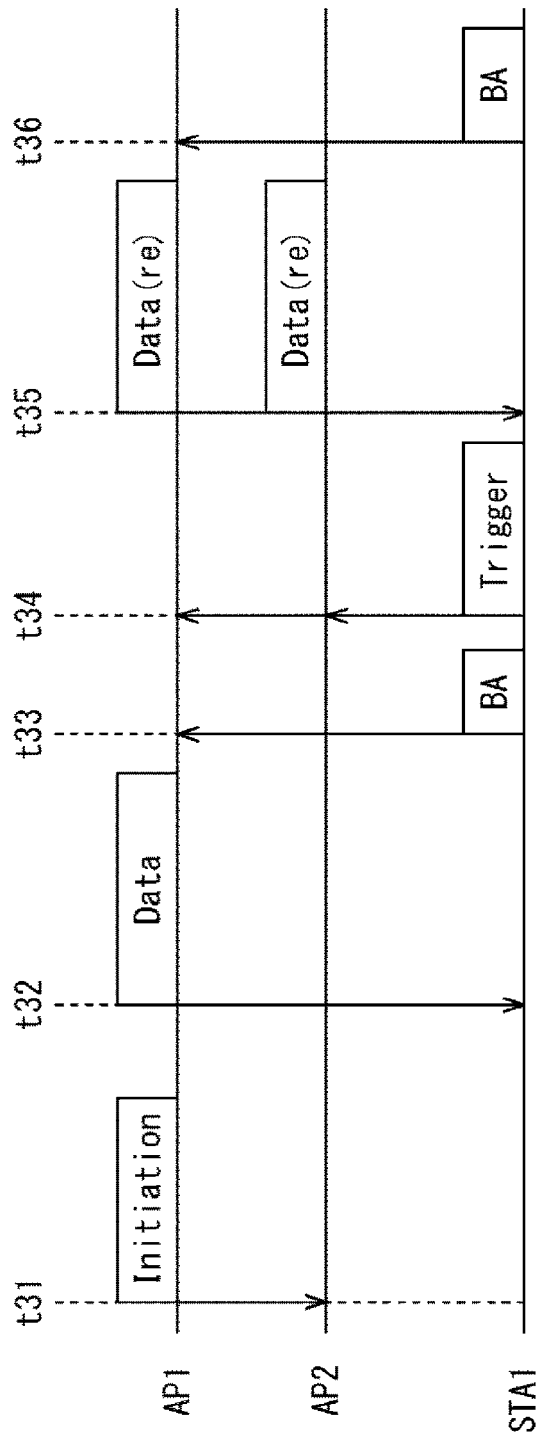
FIG. 9 is a diagram illustrating yet another example of the operation sequence of the wireless communication system.

FIG. 9 is a diagram illustrating yet another example of the operation sequence of the wireless communication system 1.

An operation before transmission of a first BA signal in the sequence of FIG. 9 is the same as an operation before transmission of a first BA signal in the sequence of FIG. 2. Therefore, the detailed description thereof is appropriately omitted.

At time t31, AP1 transmits an Initiation signal to AP2.

AP2 receives the Initiation signal that has been transmitted from AP1.

At time t32, AP1 transmits a Data signal including data addressed to STA1.

STA1 receives the Data signal, and demodulates the Data signal to obtain data addressed to the local apparatus. When STA1 is receiving the Data signal, AP2 receives and holds the Data signal addressed to STA1 that has been transmitted from AP1, on the basis of the content of the Initiation signal.

Thereafter, at time t33, STA1 transmits, to AP1, information relating to a result indicating success or failure in demodulation of the Data signal as a BA signal.

AP1 receives the BA signal that has been transmitted from STA1.

On the other hand, after transmitting the BA signal, STA1 determines data to be retransmitted in the Data signal that is indicated by the BA signal and that STA1 has failed to demodulate. At time t34, STA1 transmits, to AP1 and AP2, a Trigger signal that makes a request to transmit data to be retransmitted.

The Trigger signal may be transmitted a certain time period after the BA signal, or may be transmitted after an SIFS defined by IEEE 802.11 has passed. A configuration of the Trigger signal is similar to a configuration of the Trigger signal described above with reference to FIG. 2.

AP1 and AP2 receive the Trigger signal that has been transmitted from STA1. At time t35, AP1 and AP2 that have received the Trigger signal transmit a Data signal including data that is indicated by the Trigger signal and that a request to transmit has been made, to STA1 according to a communication method and resources that are indicated by the Trigger signal.

STA1 receives the Data signal that has been transmitted from AP1, and transmits, to AP1, information relating to a result indicating success or failure in demodulation of the Data signal as a BA signal at time t36.

AP1 receives the BA signal that has been transmitted from STA1.

According to the sequence described above, STA1 itself that needs retransmission can specify data to be retransmitted, a transmission method, and transmission resources. Furthermore, STA1 itself can select AP that will perform retransmission.

2. Second Embodiment (Example of Constrained Topology

Example of Configuration of Wireless Communication System

Figure 10:
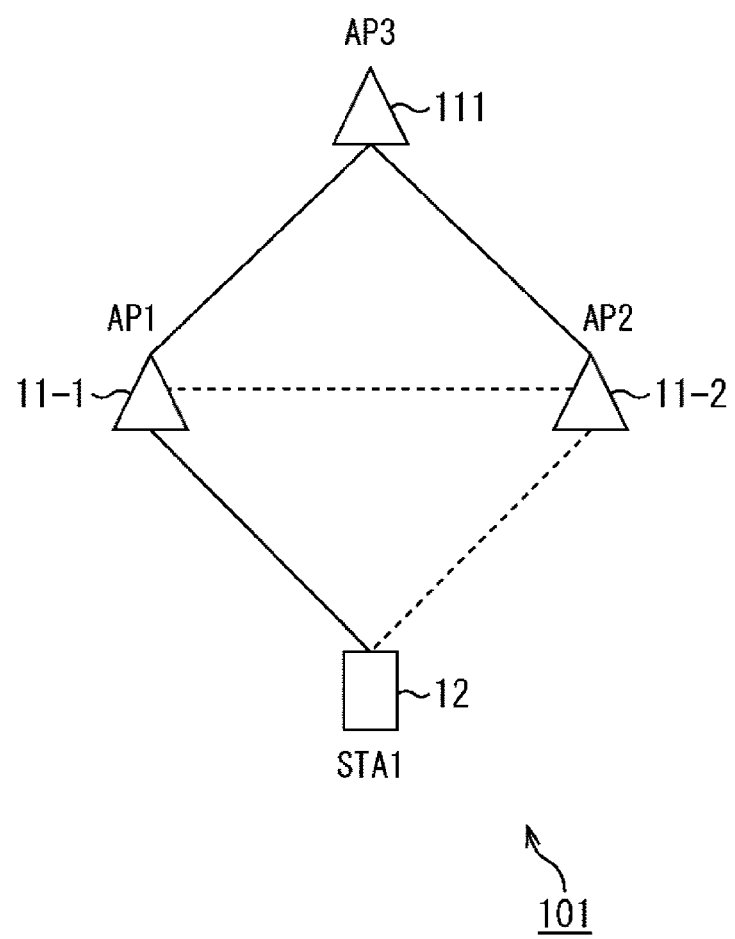
FIG. 10 is a diagram illustrating an example of a configuration of a wireless communication system according to a second embodiment of the present technology.

FIG. 10 is a diagram illustrating an example of a configuration of a wireless communication system according to a second embodiment of the present technology.

A wireless communication system 101 illustrated in FIG. 10 is different from the wireless communication system 1 illustrated in FIG. 1 in that AP3 serving as a base station that is connected to both a base station AP1 and a base station AP2 has been added. Corresponding portions are denoted by corresponding reference signs, and the description thereof is omitted. The wireless communication system 1 of FIG. 10 is a constrained topology wireless communication system.

AP3 includes a wireless communication apparatus 111. The wireless communication apparatus 111 will be described later.

In the wireless communication system 101, AP1 transmits an Initiation signal to AP3 in addition to AP2. Furthermore, after receiving a first BA signal that has been transmitted from STA1, AP1 transmits, to AP3, a Trigger Request signal (also referred to as a Trigger Req signal) that makes a request to transmit a Trigger signal.

AP3 receives the Initiation signal that has been transmitted from AP1, and also receives the Trigger Req signal. In response to the Trigger Req signal from AP1, AP3 transmits a Trigger signal to at least either AP1 or AP2 in accordance with the content of the Trigger Req signal.

By doing the above, at least either AP1 or AP2 that has received the Trigger signal transmitted from AP3 can transmit a Data signal to AP2.

As described above, in the wireless communication system 101, AP is caused to hold a Data signal including data to be held, and AP is caused to operate to transmit the Data signal upon receipt of a transmission request. In addition, AP that will be requested to perform transmission can be selected. By doing this, in a case where a plurality of wireless communication apparatuses holds a Data signal, an appropriate wireless communication apparatus can be requested to perform transmission.

Example of Operation Sequence

Figure 11:
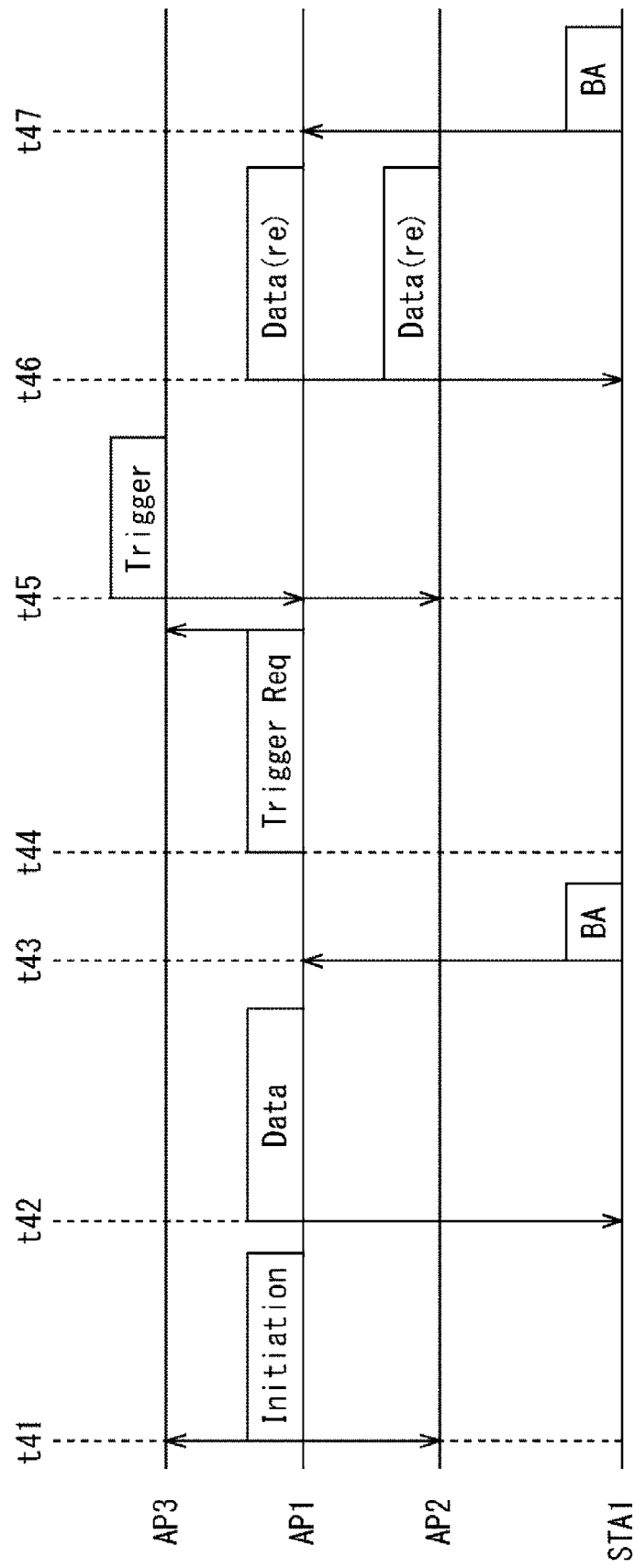
FIG. 11 is a diagram illustrating an example of an operation sequence of the wireless communication system of FIG. 10.

FIG. 11 is a diagram illustrating an example of an operation sequence of the wireless communication system 101.

FIG. 11 illustrates operation sequences of a plurality of base stations AP1 and AP2, STA1 serving as a slave unit that is connected to AP1, and a base station AP3 that is connected to each of the plurality of base stations.

At time t41, AP1 transmits a first Initiation signal to AP2. Furthermore, at this time, AP1 transmits a second Initiation signal to AP3.

The first Initiation signal is a signal that causes AP2 to operate to hold a Data signal that AP1 has transmitted to STA1 and transmit the Data signal to STA1 upon receipt of a transmission request from AP3.

The second Initiation signal is a signal that causes AP3 to operate to transmit a transmission request to AP1 and AP2 when AP1 makes a request to transmit the transmission request.

Note that the first and second Initiation signals may be transmitted to AP2 and AP3 as a single Initiation signal. Information included in an Initiation signal is similar to information included in an Initiation signal according to the first embodiment. Furthermore, the Initiation signal may be transmitted to AP1 and AP2 by AP3.

AP2 and AP3 that have received the Initiation signal may transmit an Ack signal for confirming transmission in response.

After transmitting the Initiation signal, at time t42, AP1 transmits a Data signal including data addressed to STA1.

STA1 receives the Data signal that has been transmitted from AP1. At this time, AP2 receives and holds the Data signal addressed to STA1 that has been transmitted from AP1, on the basis of the content of the Initiation signal.

Thereafter, at time t43, STA1 transmits, to AP1, information relating to a result indicating success or failure in demodulation of the Data signal as a BA signal.

AP1 receives the BA signal that has been transmitted from STA1. AP1 determines data to be retransmitted in the Data signal that is indicated by the BA signal and that STA1 has failed to demodulate. This determination is performed on the basis of information relating to an upper limit of the number of times of retransmission of data, information relating to an allowable delay time, or information relating to a discarding deadline.

At time t44, AP1 transmits, to AP3, a Trigger Req signal that makes a request to transmit a Trigger signal that makes a request to transmit data to be retransmitted.

The Trigger Req signal may include information relating to an identifier that specifies AP2 serving as a destination of the Trigger signal. The Trigger Req signal may include information included in a Trigger signal according to the first embodiment. The Trigger Req signal may include information relating to a transmission timing of the Trigger signal.

AP3 receives the Trigger Req signal that has been transmitted from AP1. At time t45, AP3 transmits a Trigger signal to AP1 and AP2.

AP1 and AP2 receive the Trigger signal that has been transmitted from AP3. At time t46, AP1 and AP2 transmit a Data signal to STA1.

STA1 receives the Data signal, and demodulates the Data signal to obtain data addressed to the local apparatus. Thereafter, at time t47, STA1 transmits, to AP1, information relating to a result indicating success or failure in demodulation of the Data signal, for example, as a BA signal.

According to the sequence described above, in a case where a plurality of wireless communication apparatuses can serve as AP2 that is connected to AP3, an appropriate AP2 can be selected in consideration of characteristics of the wireless communication system 101.

Note that before the sequence of FIG. 11 is started, respective wireless communication apparatuses may mutually perform function correspondence checking for checking whether or not functions correspond to the sequence of the present technology.

<Configuration of Apparatus>

A configuration of the wireless communication apparatus 111 that operates as AP3 is a configuration that is basically similar to a configuration of the wireless communication apparatus 11. Hereinafter, the configuration of the wireless communication apparatus 111 is described by appropriately citing the configuration of the wireless communication apparatus 11.

In a case where the configuration of the wireless communication apparatus 111 is described, the reception control unit 62 receives an Initiation signal that has been transmitted from AP1, and also receives a Trigger Req signal. In response to the Trigger Req signal from AP1, the transmission control unit 61 transmits a Trigger signal to AP1 and AP2.

<Processing of Wireless Communication Apparatus 11-1 (AP1)>

Figure 12:
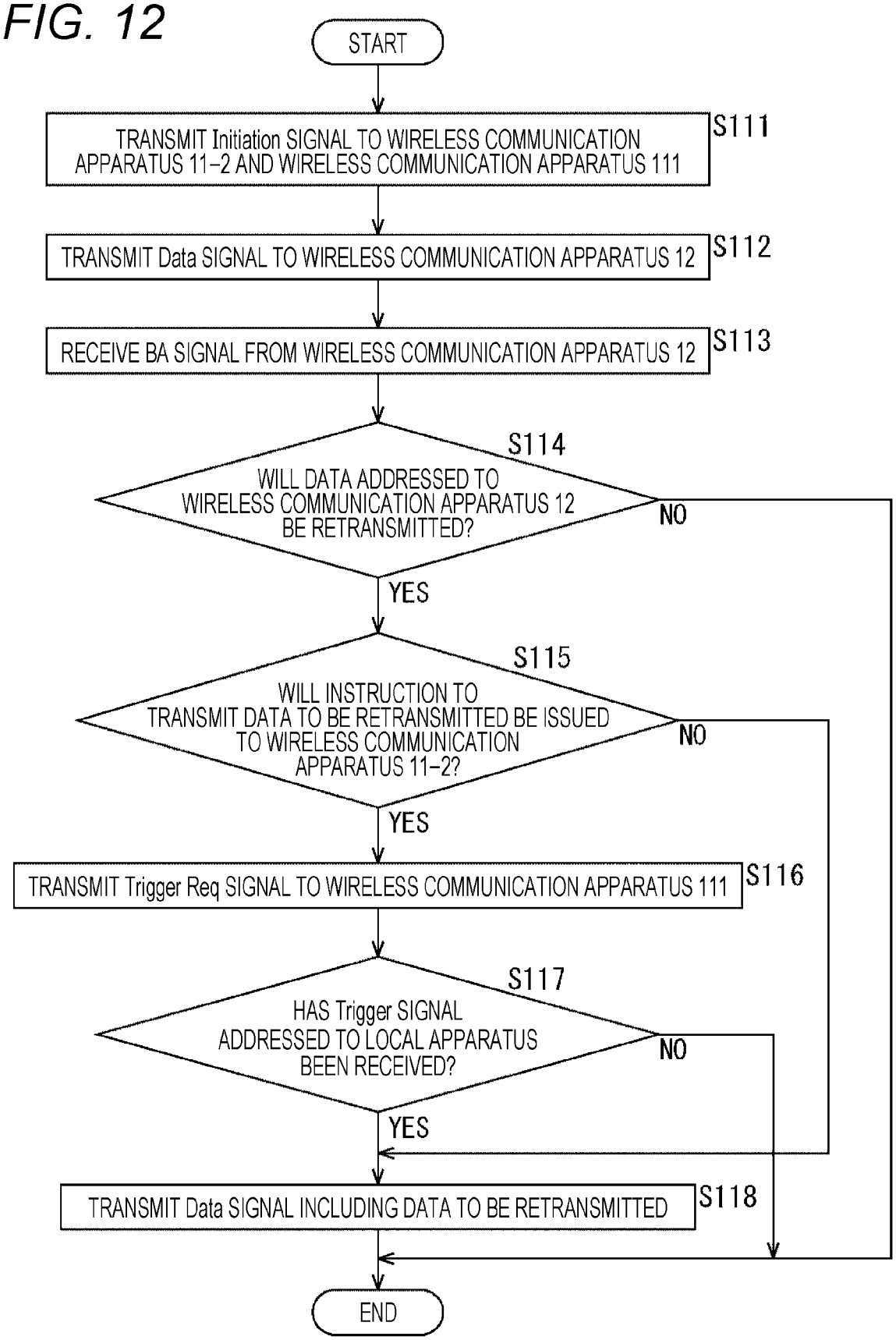
FIG. 12 is a flowchart explaining communication processing of a wireless communication apparatus that operates as AP1.

FIG. 12 is a flowchart explaining communication processing of a wireless communication apparatus 11-1 that operates as AP1.

In step S111, the transmission control unit 61 of the wireless communication apparatus 11-1 controls respective units of the communication unit 33 to transmit an Initiation signal to the wireless communication apparatus 11-2 and the wireless communication apparatus 111.

In step S112, the transmission control unit 61 controls respective units of the communication unit 33 to transmit a Data signal to the wireless communication apparatus 12.

The wireless communication apparatus 12 that has received the Data signal transmits, to the wireless communication apparatus 11-1, a BA signal in response to the Data signal (step S32 in FIG. 5).

In step S113, the reception control unit 62 controls respective units of the communication unit 33 to receive the Data signal that has been transmitted from the wireless communication apparatus 12.

In step S114, the transmission control unit 61 determines whether or not data addressed to the wireless communication apparatus 12 will be retransmitted, on the basis of the BA signal. In a case where it has been determined in step S114 that data addressed to the wireless communication apparatus 12 will be retransmitted, the processing moves on to step S115.

In step S115, the transmission control unit 61 determines whether or not an instruction to transmit data to be retransmitted will be issued to the wireless communication apparatus 11-2. In a case where it has been determined in step S115 that an instruction to transmit data to be retransmitted will be issued to the wireless communication apparatus 11-2, the processing moves on to step S116.

In step S116, the transmission control unit 61 transmits a Trigger Req signal to the wireless communication apparatus 111.

In response to the Trigger Req signal, the wireless communication apparatus 111 transmits a Trigger signal to the wireless communication apparatuses 11-1 and 11-2 (step S163 in FIG. 14 described later).

In step S117, the transmission control unit 61 determines whether or not a Trigger signal addressed to the local apparatus has been received. In a case where it has been determined in step S117 that a Trigger signal addressed to the local apparatus has been received, the processing moves on to step S118.

Furthermore, in a case where it has been determined in step S115 that an instruction to transmit data to be retransmitted will not be issued to the wireless communication apparatus 11-2, the processing moves on to step S118.

In step S118, the transmission control unit 61 controls respective units of the communication unit 33 to transmit, to the wireless communication apparatus 12, a Data signal including data to be retransmitted.

After the Data signal including data to be retransmitted has been transmitted to the wireless communication apparatus 12 in step S118, the communication processing of the wireless communication apparatus 11-1 is terminated.

Furthermore, similarly in a case where it has been determined in step S114 that data addressed to the wireless communication apparatus 12 will not be retransmitted and in a case where it has been determined in step S117 that a Trigger signal addressed to the local apparatus has not been received, the communication processing of the wireless communication apparatus 11-1 is terminated.

<Processing of Wireless Communication Apparatus 12 (STA1)>

Communication processing of the wireless communication apparatus 12 that operates as STA1 is processing that is similar to the communication processing described above with reference to FIG. 5. Therefore, the description thereof is omitted.

<Processing of Wireless Communication Apparatus 11-2 (AP2)>

Figure 13:
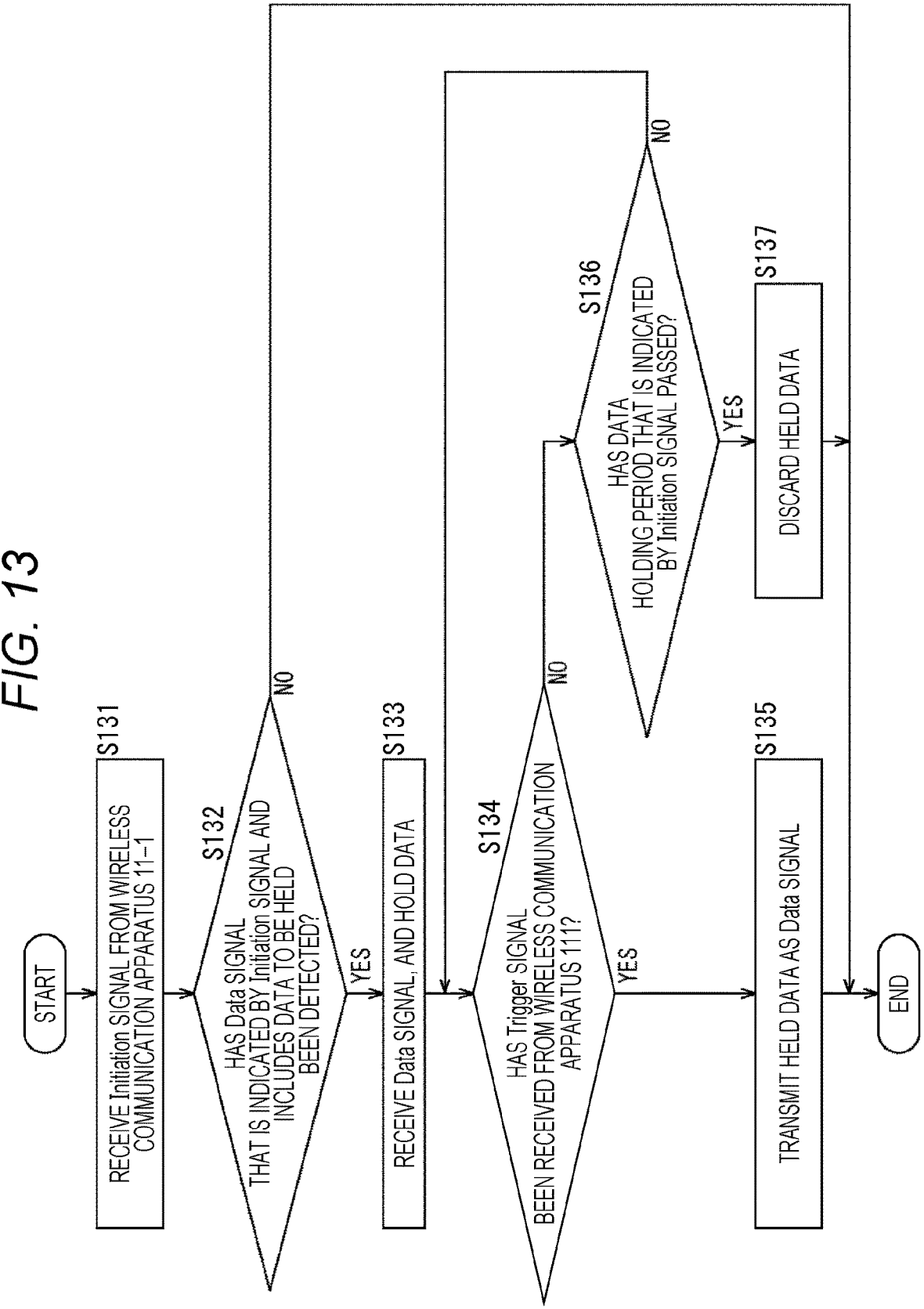
FIG. 13 is a flowchart explaining communication processing of a wireless communication apparatus that operates as AP2.

FIG. 13 is a flowchart explaining communication processing of the wireless communication apparatus 11-2 that operates as AP2.

The wireless communication apparatus 11-1 transmits an Initiation signal to the wireless communication apparatus 11-2 and the wireless communication apparatus 111 (step S111 in FIG. 12).

In step S131, the reception control unit 62 of the wireless communication apparatus 11-2 receives the Initiation signal that has been transmitted from the wireless communication apparatus 11-1.

In step S132, the reception control unit 62 determines whether or not a Data signal that is indicated by the Initiation signal and includes data to be held has been detected. In a case where it has been determined in step S132 that the Data signal that is indicated by the Initiation signal and includes data to be held has been detected, the processing moves on to step S133.

In step S133, the reception control unit 62 receives the Data signal, and holds data included in the Data signal.

The wireless communication apparatus 111 transmits a Trigger signal to the wireless communication apparatus 11-2 (step S163 in FIG. 14 described later).

In step S134, the reception control unit 62 determines whether or not the Trigger signal has been received from the wireless communication apparatus 111. In a case where it has been determined in step S134 that the Trigger signal has been received from the wireless communication apparatus 111, the processing moves on to step S135.

In step S135, the transmission control unit 61 transmits, to the wireless communication apparatus 12, held data as a Data signal including data to be retransmitted.

On the other hand, in a case where it has been determined in step S134 that the Trigger signal has not been received from the wireless communication apparatus 11-1, the processing moves on to step S136.

In step S136, the reception control unit 62 determines whether or not a data holding period that is indicated by the Initiation signal has passed. In a case where it has been determined in step S136 that a data holding period that is indicated by the Initiation signal has passed, the processing moves on to step S137.

In step S137, the reception control unit 62 discards held data.

In a case where it has been determined in step S136 that a data holding period that is indicated by the Initiation signal has not passed, the processing returns to step S134, and the process of step S134 and processes that follow are repeated.

After the Data signal has been transmitted in step S135 and after data has been discarded in step S137, the communication processing of the wireless communication apparatus 11-2 is terminated.

Furthermore, similarly in a case where it has been determined in step S132 that a Data signal that is indicated by the Initiation signal and includes data to be held has not been detected, the communication processing of the wireless communication apparatus 11-2 is terminated.

<Processing of Wireless Communication Apparatus 111 (AP3)>

Figure 14:
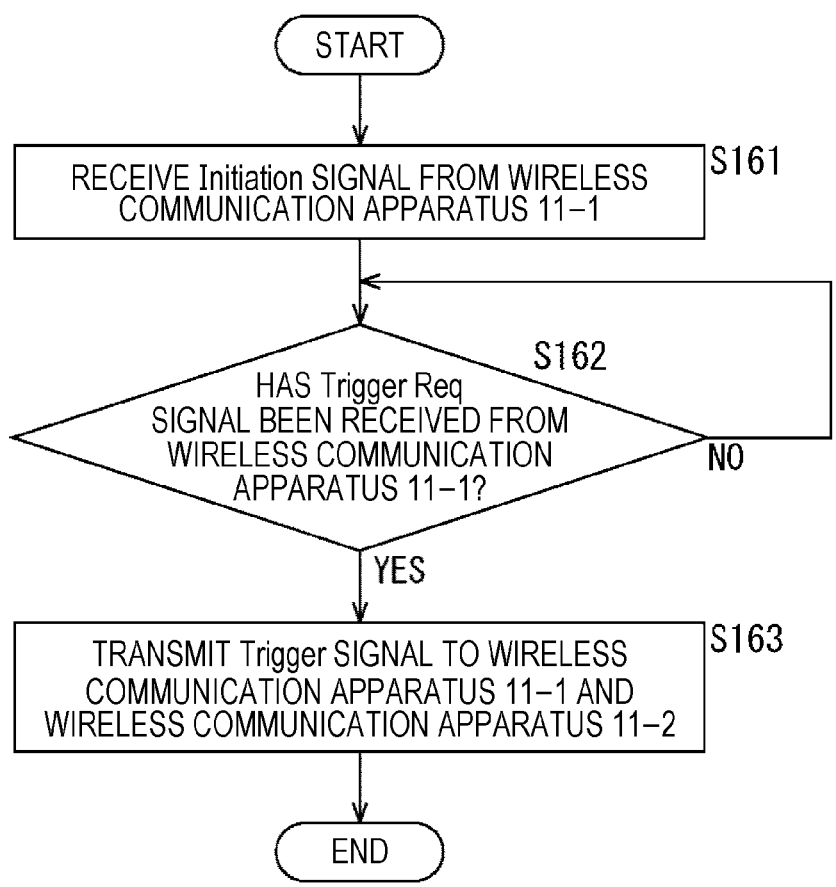
FIG. 14 is a flowchart explaining communication processing of a wireless communication apparatus that operates as AP3.

FIG. 14 is a flowchart explaining communication processing of the wireless communication apparatus 111 that operates as AP3.

The wireless communication apparatus 11-1 transmits an Initiation signal to the wireless communication apparatus 11-2 and the wireless communication apparatus 111 (step S111 in FIG. 12).

In step S161, the reception control unit 62 of the wireless communication apparatus 111 receives the Initiation signal that has been transmitted from the wireless communication apparatus 11-1.

The wireless communication apparatus 11-1 transmits a Trigger Req signal to the wireless communication apparatus 111 (step S116 in FIG. 12).

The reception control unit 62 stands by until it has been determined in step S162 that the Trigger Req signal has been received from the wireless communication apparatus 11-1. In a case where it has been determined in step S162 that the Trigger Req signal has been received from the wireless communication apparatus 11-1, the processing moves on to step S163.

In step S163, the transmission control unit 61 transmits a Trigger signal to the wireless communication apparatuses 11-1 and 11-2. After the Trigger signal has been transmitted, the communication processing of the wireless communication apparatus 111 is terminated.

3. Data Configuration

Example of Configuration of Format Used in Data Signal

Figure 15:
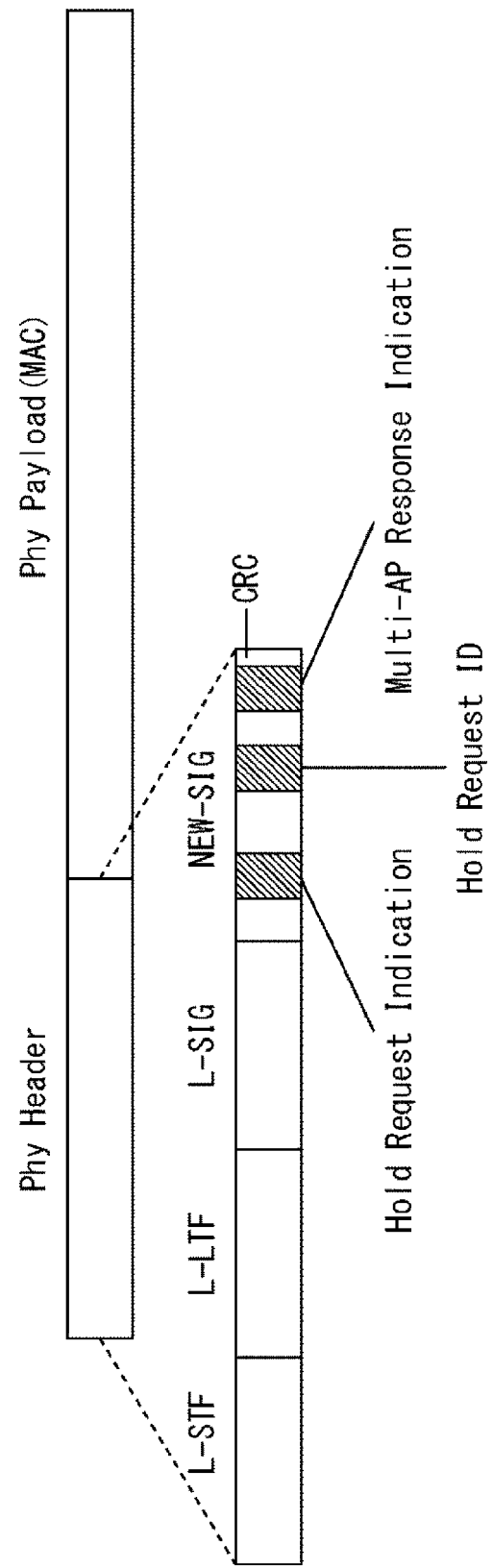
FIG. 15 is a diagram illustrating an example of a configuration of a format used in a Data signal.

FIG. 15 is a diagram illustrating an example of a configuration of a format used in a Data signal.

A Data signal illustrated in FIG. 15 includes a physical header (Phy Header) disposed at the head, and a physical payload (Phy Payload).

CRC has been added at the end of Phy Header. Therefore, AP2 can determine whether or not a Data signal stores data to be held on the basis of only Phy Header, without receiving the entirety of the Data signal.

Phy Header includes a legacy short training field (L-STF), a legacy long training field (L-LTF), and a legacy signal field (L-SIG).

In Phy Header of FIG. 15, NEW-SIG serving as a region where information relating to a holding request that makes a request to hold a signal is stored is disposed after L-SIG.

In NEW-SIG, Hold Request Indication, Hold Request ID, and Multi-AP Response Indication are stored as information relating to a signal holding request.

Hold Request Indication is information relating to a report indicating that data needs to be held.

Hold Request ID is information relating to a holding ID that has been reported by an Initiation signal.

Multi-AP Response Indication is instruction information that causes STA1 to transmit information relating to a result indicating success or failure in demodulation to both AP1 and AP2.

Note that data included in a Data signal that has been transmitted by using this format is stored in Phy Payload. The portion "Phy Payload" corresponds to MPDU serving as data of a MAC layer.

Example of Configuration of Format of Frame in which Initiation Signal is Stored FIG. 16 is a diagram illustrating an example of a configuration of a format of a frame in which an Initiation signal is stored.

A frame illustrated in FIG. 16 includes respective fields, Signal Type, Length, Hold Request ID, Hold Data Amount, and Hold Period. This frame is included, for example, in MAC Header or MAC Payload of MPDU serving as a data unit in a MAC layer.

In the field "Signal Type", information indicating that this frame is a frame relating to holding of a signal is included.

In the field "Length", information relating to a length of a frame is included.

In the field "Hold Request ID", information relating to a holding ID for identifying a signal that includes data to be held is included.

In "Hold Data Amount", information relating to an amount of data to be held is included.

In "Hold Period", information relating to a period during which data will be held is included.

Example of Configuration of Format of Frame in which Trigger Signal is Stored FIG. 17 is a diagram illustrating an example of a configuration of a format of a frame in which a Trigger signal is stored.

A frame illustrated in FIG. 17 includes respective fields, Signal Type, Length, Transmit Data ID, Transmit Scheme, Transmit Resource, and Transmit time. This frame is also included, for example, in MAC Header or MAC Payload of MPDU serving as a data unit in a MAC layer.

In the field "Signal Type", information indicating that this frame is a frame relating to a transmission request is included.

In the field "Length", information relating to a length of a frame is included.

In the field "Transmit Data ID", information relating to a holding ID for identifying data serving as a target for a transmission request is included.

In "Transmit Scheme", information relating to a communication scheme used to transmit data serving as a transmission request is included.

In "Transmit Resource", information relating to communication resources used to transmit data serving as a target for a transmission request is included.

In "Transmit time", information relating to a transmission timing of data serving as a target for a transmission request is included.

Note that the examples illustrated in FIGS. 16 and 17 of a configuration of a format of a frame are examples. A frame of the present technology can be configured in another format that is different from the format described above.

4. Others

Effects

As described above, in the present technology, AP2 is caused to operate in such a way that a Data signal including data is held by AP2, and the Data signal is transmitted to STA1 when a transmission request has been received.

By doing this, data that has failed to be demodulated can be retransmitted with higher reliability.

Furthermore, by performing transmission again from each of AP1 and AP2 to STA1, a diversity gain is obtained, and a high SINR can be obtained.

Moreover, by transmitting a Data signal from a plurality of APs only at the time of retransmission, the transmission opportunity of one AP is not wasted. This can avoid a reduction in throughput.

Furthermore, another AP holds a transmitted Data signal, and therefore communication that aims at sharing is not performed, and the generation of overhead can be avoided.

Moreover, communication routes are not switched. Therefore, connection does not need to be established, and the generation of overhead can be avoided.

Example of Configuration of Computer

The series of processes described above can be implemented by hardware, or can be implemented by software. In a case where the series of processes is implemented by software, a program that configures the software is installed in a computer incorporated into dedicated hardware, a general-purpose personal computer, or the like from a program recording medium.

FIG. 21 is a block diagram illustrating an example of a configuration of hardware of a computer that performs the series of processes described above by using a program.

A central processing unit (CPU) 301, a read only memory (ROM) 302, and a random access memory (RAM) 303 are connected to each other via a bus 304.

The bus 304 is further connected to an input/output interface 305. The input/output interface 305 is connected to an input unit 306 that includes a keyboard, a mouse, or the like, and an output unit 307 that includes a display, a speaker, or the like. Furthermore, the input/output interface 305 is connected to a storage 308 that includes a hard disk, a non-volatile memory, or the like, a communication unit 309 that includes a network interface or the like, and a drive 310 that drives a removable medium 311.

In the computer configured as described above, the CPU 301 loads, for example, a program stored in the storage 308 into the RAM 303 via the input/output interface 305 and the bus 304, and executes the program, and therefore the series of processes described above is performed.

A program executed by the CPU 301 is recorded, for example in the removable medium 311, or is provided via a wired or wireless transmission medium such as a local area network, the Internet, or digital broadcasting, and is installed in the storage 308.

Note that the program executed by the computer may be a program that causes processing to be performed in time series in the order described herein, or may be a program that causes processing to be performed in parallel or at a required timing such as a timing at which calling is executed.

Note that herein a system means a set of a plurality of components (apparatuses, modules (parts), or the like), and it does not matter whether or not all of the components are located in the same housing. Accordingly, both a plurality of apparatuses that is stored in different housings and is connected via a network, and a single apparatus in which a plurality of modules is stored in a single housing are a system.

Furthermore, the effects described herein are only illustrative and are not restrictive, and other effects may be exhibited.

Embodiments of the present technology are not limited to the embodiments described above, and various changes can be made without departing from the gist of the present technology.

For example, the present technology can employ a configuration of cloud computing in which a single function is shared by a plurality of apparatuses via a network and the plurality of apparatuses performs processing in cooperation with each other.

Note that the respective steps described in the flowcharts described above can be performed by a single apparatus, or can be shared and performed by a plurality of apparatuses.

Furthermore, in a case where a plurality of processes is included in a single step, the plurality of processes included in the single step can be performed by a single apparatus, or can be shared and performed by a plurality of apparatuses.

Example of Combination of Configurations

The present technology can also employ the configurations described below.

(1)
A communication control apparatus including:
  a transmission control unit that causes a first wireless communication apparatus to hold a Data signal including data, and causes the first wireless communication apparatus to operate to transmit the Data signal to a second wireless communication apparatus upon receipt of a transmission request.

(2)
The communication control apparatus according to (1) described above,
  in which the transmission control unit causes the first wireless communication apparatus to transmit an Initiation signal including holding information for causing the first wireless communication apparatus to hold the Data signal.

(3)
The communication control apparatus according to (2) described above,
  in which the holding information includes information that identifies the data.

(4)
The communication control apparatus according to (2) or (3) described above,
  in which the holding information includes information relating to a type and an amount of the data.

(5)
The communication control apparatus according to any of (2) to (4) described above,
  in which the holding information is described in a physical header of the Data signal.

(6)
The communication control apparatus according to any of (1) to (5) described above,
  in which the transmission control unit causes the first wireless communication apparatus to transmit a Trigger signal for causing the Data signal to be transmitted.

(7)
The communication control apparatus according to (6) described above,
  in which the Trigger signal includes information relating to an identifier of the Data signal.

(8)
The communication control apparatus according to (6) or (7) described above,
  in which the Trigger signal includes information relating to a communication scheme and resources that are used to transmit the Data signal.

(9)
The communication control apparatus according to any of (6) to (8) described above,
  in which the Trigger signal includes information relating to a transmission timing of the Data signal.

(10)
The communication control apparatus according to any of (6) to (9) described above,
  in which the transmission control unit requests that a third wireless communication apparatus transmit the Trigger signal.

(11)
The communication control apparatus according to (1) described above,
  in which the transmission control unit transmits an Initiation signal that causes the first wireless communication apparatus to hold the Data signal, and determines the Data signal to be transmitted by the first wireless communication apparatus on the basis of a reception result of a transmission destination.

(12)
The communication control apparatus according to (1) described above,
  in which the transmission control unit transmits the Data signal to be transmitted by the second wireless communication apparatus, at a timing that is identical to a timing of the first wireless communication apparatus.

(13)
A communication control method performed by a communication control apparatus, the communication control method including:
  causing a first wireless communication apparatus to hold a Data signal including data, and causing the first wireless communication apparatus to operate to transmit the Data signal to a second wireless communication apparatus upon receipt of a transmission request.

(14)
A wireless communication apparatus including:
  a transmission unit that holds a Data signal including data, and transmits the Data signal upon receipt of a transmission request, on the basis of an instruction of a communication control apparatus.

(15)
The wireless communication apparatus according to (14) described above, further including:
  a reception unit that receives an Initiation signal that has been transmitted from the communication control apparatus, the Initiation signal including holding information for holding the Data signal.

(16)
The wireless communication apparatus according to (15) described above, in which the reception unit holds the Data signal on the basis of the holding information.

(17)
The wireless communication apparatus according to (16) described above,
in which the reception unit determines whether or not the Data signal that has been transmitted from the communication control apparatus is the Data signal including data to be held, on the basis of information described in a physical header of the Data signal.

(18)
The wireless communication apparatus according to any of (15) to (17),
in which the reception unit receives, from the communication control apparatus, a Trigger signal including information for causing the Data signal to be transmitted.

(19)
The wireless communication apparatus according to (18),
in which the transmission unit transmits the Data signal on the basis of the information included in the Trigger signal.

(20)
A wireless communication method performed by a wireless communication apparatus, the wireless communication method including:
holding a Data signal including data, and transmitting the Data signal upon receipt of a transmission request, on the basis of an instruction of a communication control apparatus.

(21)
A wireless communication apparatus including:
a demodulator that receives and demodulates a Data signal that has been transmitted from a communication control apparatus, the Data signal including data to be held, and receives and demodulates information that has failed to be correctly demodulated, the information being at least part of information included in the Data signal that has been transmitted from at least one of the communication control apparatus or another wireless communication apparatus.

(22)
The wireless communication apparatus according to (21) described above,
in which the demodulator receives and demodulates the information being at least part of the information included in the Data signal that has been transmitted from the communication control apparatus.

(23)
The wireless communication apparatus according to (21) described above,
in which the demodulator receives and demodulates the information being at least part of the information included in the Data signal that has been transmitted from the other wireless communication apparatus.

(24)
The wireless communication apparatus according to (21) described above,
in which the demodulator receives the information being at least part of the information included in the Data signal that has been transmitted from each of the communication control apparatus and the other wireless communication apparatus, and combines and demodulates a plurality of pieces of the information.

(25)
The wireless communication apparatus according to any of (21) to (24) described above, further including:
a transmission unit that transmits a Trigger signal including information for causing the communication control apparatus and the other wireless communication apparatus to transmit the information being at least part of the information included in the Data signal.

(26)
The wireless communication apparatus according to any of (21) to (24) described above, further including:
a transmission unit that transmits a block ack signal including information relating to success or failure in demodulation of the information included in the Data signal to at least one of the communication control apparatus or the other wireless communication apparatus.

(27)
A wireless communication method performed by a wireless communication apparatus, the wireless communication method including:
receiving and demodulating a Data signal that has been transmitted from a communication control apparatus, the Data signal including data to be held, and receiving and demodulating information that has failed to be correctly demodulated, the information being at least part of information included in the Data signal that has been transmitted from at least one of the communication control apparatus or another wireless communication apparatus.

REFERENCE SIGNS LIST

1 Wireless communication system
11 Wireless communication apparatus
12 Wireless communication apparatus
31 Control unit
32 Power source
33 Communication unit
51 Data processing unit
52 Wireless control unit
53 Modulator/demodulator
54 Signal processing unit
55 Channel estimator
56, 56-1 to 56-N Wireless I/F unit
57, 57-1 to 57-N Amplifier
58, 58-1 to 58-N Antenna
61 Transmission control unit
62 Reception control unit
101 Wireless communication system
111 Wireless communication apparatus

The invention claimed is:
1. A communication control apparatus, comprising:
processing circuitry configured to:
cause a first wireless communication apparatus to hold a data signal including data;
control transmission of the data signal to a second wireless communication apparatus;
control reception of a block acknowledgement signal from the second wireless communication apparatus;
determine, based on the block acknowledgement signal, the data of the data signal that the second wireless communication apparatus has failed to demodulate;
control, based on the determination of the data of the data signal that the second wireless communication apparatus has failed to demodulate, transmission of a trigger signal to the first wireless communication apparatus; and cause, based on the transmitted trigger signal, the first wireless communication apparatus to retransmit the data signal to the second wireless communication apparatus.

2. The communication control apparatus according to claim 1, wherein the processing circuitry is further configured to:
control transmission of an initiation signal to the first wireless communication apparatus, wherein the initiation signal includes holding information; and
control, based on the transmitted initiation signal, the first wireless communication apparatus to hold the data signal.

3. The communication control apparatus according to claim 2, wherein the holding information includes information that identifies the data signal to be held.

4. The communication control apparatus according to claim 1, wherein the trigger signal includes information relating to an identifier of the data signal that identifies data serving as a target for a retransmission request.

5. The communication control apparatus according to claim 1, wherein the processing circuitry is further configured to request a third wireless communication apparatus to transmit the trigger signal.

6. The communication control apparatus according to claim 1, wherein the processing circuitry is further configured to:
control transmission of an initiation signal that causes the first wireless communication apparatus to hold the data signal; and
determine, based on a reception result of a transmission destination, the data signal to be retransmitted by the first wireless communication apparatus.

7. The communication control apparatus according to claim 1, wherein
the processing circuitry is further configured to control retransmission of the data signal to be transmitted by the first wireless communication apparatus, and
a time of the retransmission of the data signal by the first wireless communication apparatus is identical to a time of the retransmission of the data signal by the communication control apparatus.

8. A communication control method, comprising:
causing a first wireless communication apparatus to hold a data signal including data;
controlling transmission of the data signal to a second wireless communication apparatus;
controlling reception of a block acknowledgement signal from the second wireless communication apparatus;
determining, based on the block acknowledgement signal, the data of the data signal that the second wireless communication apparatus has failed to demodulate;
controlling, based on the determination of the data of the data signal that the second wireless communication apparatus has failed to demodulate, transmission of a trigger signal to the first wireless communication apparatus; and
causing, based on the transmitted trigger signal, the first wireless communication apparatus to retransmit the data signal to the second wireless communication apparatus.

9. A wireless communication apparatus, comprising:
processing circuitry configured to:
control reception of a data signal including data from a first wireless communication apparatus;
hold the data signal including data;
control reception of a trigger signal from the first wireless communication apparatus, wherein
the trigger signal is received based on a failure in demodulation of the data signal by a second wireless communication apparatus,
the first wireless communication apparatus has transmitted the data signal to the second wireless communication apparatus, and
the trigger signal includes information to cause retransmission of the data signal to the second wireless communication apparatus; and
control retransmission of the data signal to the second wireless communication apparatus based on the reception of the trigger signal.

10. The wireless communication apparatus according to claim 9, wherein
the processing circuitry is further configured to control reception of an initiation signal transmitted from the first wireless communication apparatus, and
the initiation signal includes holding information for holding the data signal.

11. The wireless communication apparatus according to claim 10, wherein the processing circuitry is further configured to hold the data signal based on the holding information.

12. The wireless communication apparatus according to claim 10, wherein the processing circuitry is further configured to control the retransmission of the data signal based on the information included in the trigger signal.

13. A wireless communication method, comprising:
controlling reception of a data signal including data from a first wireless communication apparatus;
holding the data signal including data;
controlling reception of a trigger signal from the first wireless communication apparatus, wherein
the trigger signal is received based on a failure in demodulation of the data signal by a second wireless communication apparatus
the first wireless communication apparatus has transmitted the data signal to the second wireless communication apparatus, and
the trigger signal includes information to cause retransmission of the data signal to the second wireless communication apparatus; and
controlling retransmission of the data signal to the second wireless communication apparatus based on the reception of the trigger signal.

14. A first wireless communication apparatus, comprising:
a demodulator configured to:
receive, from a first wireless communication apparatus, a data signal including data;
demodulate the received data signal;
receive, from a second wireless communication apparatus, a part of the data signal that has failed to be correctly demodulated; and
demodulate the received part of the data signal, wherein
the part of the data signal is retransmitted from the second wireless communication apparatus upon receipt of a first trigger signal, and
the trigger signal is transmitted from the first wireless communication apparatus to the second wireless communication apparatus.

15. The wireless communication apparatus according to claim 14, wherein the demodulator is further configured to receive the part of the data signal transmitted from each of the first wireless communication apparatus and the second wireless communication apparatus upon receipt of the trigger signal.

16. The wireless communication apparatus according to claim 15, further comprising processng circuitry configured to;
control transmission of the trigger signal including information to cause the first wireless communication apparatus and the second wireless communication apparatus to transmit the information being at least part of information included in the data signal.

17. A wireless communication method, comprising:
receiving, from a first wireless communication apparatus, a data signal including data;
demodulating the received data signal;
receiving, from a second wireless communication apparatus, a part of the data signal that has failed to be correctly demodulated; and
demodulating the received part of the data signal, wherein
the part of the data signal is transmitted from the second wireless communication apparatus upon receipt of a trigger signal, and
the trigger signal is transmitted from the first wireless communication apparatus to the second wireless communication apparatus.

* * * * *